US011254603B2

(12) United States Patent
Dejneka et al.

(10) Patent No.: US 11,254,603 B2
(45) Date of Patent: Feb. 22, 2022

(54) GRADIENT TINTED ARTICLES AND METHODS OF MAKING THE SAME

(71) Applicant: CORNING INCORPORATED, Corning, NY (US)

(72) Inventors: Matthew John Dejneka, Corning, NY (US); Jesse Kohl, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 15 days.

(21) Appl. No.: 16/778,867

(22) Filed: Jan. 31, 2020

(65) Prior Publication Data

US 2020/0255327 A1 Aug. 13, 2020

Related U.S. Application Data

(60) Provisional application No. 62/804,275, filed on Feb. 12, 2019.

(51) Int. Cl.
*C03C 10/00* (2006.01)
*C03B 32/02* (2006.01)
*C03C 4/02* (2006.01)

(52) U.S. Cl.
CPC .......... *C03C 10/0009* (2013.01); *C03B 32/02* (2013.01); *C03C 4/02* (2013.01); *C03C 2204/00* (2013.01)

(58) Field of Classification Search
CPC ... C03C 10/0009; C03C 4/02; C03C 2204/00; C03B 32/02
See application file for complete search history.

(56) References Cited

U.S. PATENT DOCUMENTS

| 3,293,052 A * | 12/1966 | Sawchuk ................ C03C 4/065 501/13 |
| 10,246,371 B1 | 4/2019 | Dejneka et al. |
| 2014/0305929 A1* | 10/2014 | Weiss ........................ C03C 4/02 219/460.1 |
| 2017/0362119 A1 | 12/2017 | Dejneka et al. |
| 2019/0177206 A1 | 6/2019 | Dejneka et al. |
| 2019/0195510 A1* | 6/2019 | Weiss .................... C03C 17/007 |

FOREIGN PATENT DOCUMENTS

WO 2019051408 A2 3/2019

OTHER PUBLICATIONS

International Search Report and Written Opinion of the International Searching Authority; PCT/US2020/014244; dated May 15, 2020; 10 Pages; European Patent Office.

* cited by examiner

*Primary Examiner* — Karl E Group
*Assistant Examiner* — Cameron K Miller
(74) *Attorney, Agent, or Firm* — Amy T. Lang; John P. McGroarty

(57) ABSTRACT

A glass-ceramic, includes a silicate-containing glass comprising a first portion and a second portion. A plurality of crystalline precipitates comprising at least one of W and Mo. The crystalline precipitates are distributed within at least one of the first and second portions of the silicate-containing glass. The glass-ceramic comprises a difference in absorbance between the first and second portions of 0.04 optical density (OD)/mm or greater over a wavelength range of from 400 nm to 1500 nm.

12 Claims, 17 Drawing Sheets

GRADIENT TINTED ARTICLES AND METHODS OF MAKING THE SAME

This application claims the benefit of priority to U.S. Provisional Application Ser. No. 62/804,275 filed on Feb. 12, 2019, the content of which is relied upon and incorporated herein by reference in its entirety.

FIELD OF THE DISCLOSURE

The present disclosure generally relates to tinted articles, and more specifically, to compositions and methods of forming gradient tinted glass and glass-ceramic articles.

BACKGROUND

Transparent and translucent articles may be colored and/or tinted for a variety of reasons. Tinting is accomplished by modifying the optical absorbance of the transparent article. Modification of the optical absorbance of an article often requires extensive additional process steps (e.g., the deposition of opaque material), use of dyed interlayers, and/or secondary processes such as etching or laser marking. The generation of gradients, indicia and/or other controlled changes in the optical absorbance of the article according to these approaches present a variety of technically challenging issues. Additionally, the processes necessary to produce a range of color or absorbance in colored glass and glass-ceramics have typically required a gradient furnace or additional thermal treatments. The use of a gradient furnace is typically more costly than conventional processes that employ an isothermal furnace.

As such, the development of a single material composition that can be processed during conventional fabrication approaches (i.e., without the need for any post-processing or other additional process steps) to produce a range of colors, while selectively controlling a desired level of transmittance may be advantageous.

SUMMARY OF THE DISCLOSURE

According to at least one feature of the present disclosure, a glass-ceramic is provided that includes a silicate-containing glass comprising a first portion and a second portion. A plurality of crystalline precipitates comprising at least one of W and Mo. The crystalline precipitates are distributed within at least one of the first and second portions of the silicate-containing glass. The glass-ceramic comprises a difference in absorbance between the first and second portions of 0.04 optical density (OD)/mm or greater over a wavelength range of from 400 nm to 1500 nm.

According to another feature of the present disclosure, a method of forming a glass-ceramic article is provided that includes: forming a glass substrate having a substantially homogenous bulk composition, wherein the glass substrate comprises a first portion and a second portion; and variably crystallizing at least one of the first and second portions of the substrate to form a plurality of crystalline precipitates within the at least one of the first and second portions, wherein the variably crystallizing of the at least one of the first and second portions results in at least one of: (a) a difference in absorbance between the first and second portions of 0.04 OD/mm to 49 OD/mm over a wavelength range of from 400 nm to 750 nm, and (b) a difference in absorbance between the first and second portions of 0.03 OD/mm to 0.69 OD/mm over a wavelength range of from 750 nm to 1500 nm.

According to another feature of the present disclosure, a method of forming a glass-ceramic article is provided that includes: forming a glass substrate having a substantially homogenous bulk composition, wherein the glass substrate comprises a first portion and a second portion; and thermally processing the first and second portions of the substrate at one or more of (a) different temperatures, (b) different heating rates and (c) different times, wherein the thermally processing step is conducted to form the glass-ceramic article and generate a plurality of crystalline precipitates in at least one of the first and second portions of the substrate such that (i) a difference in absorbance exists between the first and second portions of 0.04 OD/mm to 49 OD/mm over a wavelength range of from 400 nm to 750 nm and (ii) a Contrast Ratio between the first portion and the second portion is from 1.4 to 165 over a wavelength range of from 400 nm to 700 nm.

According to a first embodiment, a glass-ceramic is provided that includes: a silicate-containing glass comprising a first portion and a second portion; and a plurality of crystalline precipitates comprising at least one of W and Mo, wherein the crystalline precipitates are distributed within at least one of the first and second portions of the silicate-containing glass, wherein the glass-ceramic comprises a difference in absorbance between the first and second portions of 0.04 optical density (OD)/mm or greater over a wavelength range of from 400 nm to 1500 nm.

According to a second embodiment, the first embodiment is provided, wherein the plurality of crystalline precipitates comprise an oxide of the chemical form of one or more of $M_xWO_3$ and $M_xMoO_3$, wherein M is one or more of H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, and U, and $0<x<1$.

According to a third embodiment, the first or the second embodiment is provided that further includes: one or more of $WO_3$ and $MoO_3$ from 0 mol % to 15 mol % in total.

According to a fourth embodiment, any one of the first through the third embodiment is provided that further includes: at least one of: (i) Au from 0.001 mol % to 0.5 mol %, (ii) Ag from 0.025 mol % to 1.5 mol %, and (iii) Cu from 0.03 mol % to 1 mol %.

According to a fifth embodiment, any one of the first through the third embodiment is provided that further includes: at least one of: (i) Au from 0.001 mol % to 0.5 mol %, (ii) Ag from 0.1 mol % to 1 mol %, and (iii) Cu from 0.03 mol % to 1 mol %.

According to a sixth embodiment, any one of the first through the fifth embodiments is provided, wherein the plurality of crystalline precipitates comprises non-stoichiometric tungsten suboxides, and further wherein the plurality of crystalline precipitates is intercalated with dopant cations selected from the group of transition metals consisting of Ag, Au and Cu.

According to a seventh embodiment, any one of the first through the sixth embodiments is provided, wherein a Contrast Ratio between the first portion and the second portion is from 1.4 to 165 over a wavelength range of from 400 nm to 700 nm.

According to an eighth embodiment, any one of the first through the sixth embodiments is provided, wherein a Contrast Ratio between the first portion and the second portion is from 1.5 to 14 over a wavelength range of from 750 nm to 1500 nm.

According to a ninth embodiment, any one of the first through the sixth embodiments is provided, wherein the difference in absorbance between the first and second portions is from 0.04 OD/mm to 49 OD/mm over a wavelength range of from 400 nm to 750 nm.

According to a tenth embodiment, any one of the first through the ninth embodiments is provided that further includes: $V_2O_5$ from 0.0001 mol % to 0.5 mol %.

According to an eleventh embodiment, a method of forming a glass-ceramic article is provided that includes: forming a substrate having a substantially homogenous glass composition, wherein the substrate comprises a first portion and a second portion; and variably crystallizing at least one of the first and second portions of the substrate to form a plurality of crystalline precipitates within the at least one of the first and second portions. Further, the variably crystallizing of the at least one of the first and second portions results in at least one of: (a) a difference in absorbance between the first and second portions of 0.04 OD/mm to 49 OD/mm over a wavelength range of from 400 nm to 750 nm, and (b) a difference in absorbance between the first and second portions of 0.03 OD/mm to 0.69 OD/mm over a wavelength range of from 750 nm to 1500 nm.

According to a twelfth embodiment, the eleventh embodiment is provided, wherein the step of variably crystallizing further comprises thermally processing the first and second portions of the substrate at different temperatures.

According to a thirteenth embodiment, the eleventh embodiment is provided, wherein the step of variably crystallizing further comprises thermally processing the first and second portions of the substrate at the same temperature and cooling the first and second portions at different cooling rates According to a fourteenth embodiment, the eleventh or twelfth embodiment is provided, wherein the step of variably crystallizing further comprises increasing the temperature of the first and second portions at different heating rates.

According to a fifteenth embodiment, a method of forming a glass-ceramic is provided that includes: forming a substrate having a substantially homogenous glass composition, wherein the substrate comprises a first portion and a second portion; and thermally processing the first and second portions of the substrate at one or more of (a) different temperatures, (b) different heating rates and (c) different times. Further, the thermally processing step is conducted to generate a plurality of crystalline precipitates in at least one of the first and second portions of the substrate such that (i) a difference in absorbance exists between the first and second portions of 0.04 OD/mm to 49 OD/mm over a wavelength range of from 400 nm to 750 nm and (ii) a Contrast Ratio between the first portion and the second portion is from 1.4 to 165 over a wavelength range of from 400 nm to 700 nm.

According to a sixteenth embodiment, the fifteenth embodiment is provided, wherein the glass-ceramic article further comprises $WO_3$ from 0 mol % to 15 mol %.

According to a seventeenth embodiment, the fifteenth embodiment is provided, wherein the $WO_3$ is from 0 mol % to 7 mol %.

According to an eighteenth embodiment, any one of the fifteenth through the seventeenth embodiments is provided, wherein the glass-ceramic article further comprises $MoO_3$ from 0 mol % to 15 mol %.

According to a nineteenth embodiment, the eighteenth embodiment is provided, wherein the $MoO_3$ is from 0 mol % to 7 mol %.

According to a twentieth embodiment, any one of the fifteenth through the nineteenth embodiments is provided, wherein the step of thermally processing the first and second portions of the substrate is conducted such that the first and second portions are subjected to a temperature greater than 400° C. for different times.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
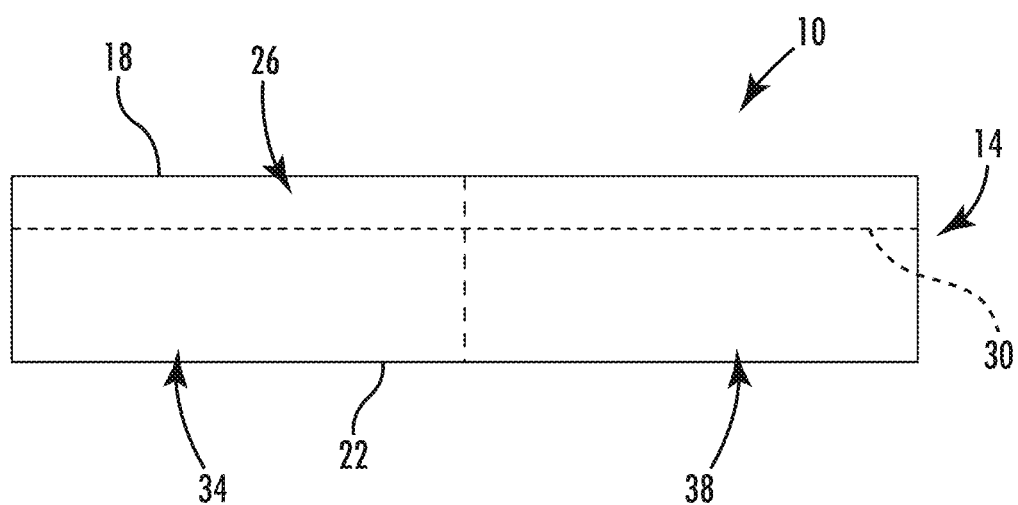
FIG. 1 is a cross-sectional view of an article, according to at least one example of the disclosure.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

Unless otherwise specified, all compositions are expressed in terms of as-batched mole percent (mol %). As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 0.2 mol % when measuring final articles as compared to the as-batched compositions provided herein. With the foregoing in mind, substantial compositional equivalence between final articles and as-batched compositions is expected.

For purposes of this disclosure, the terms "bulk," "bulk composition" and/or "overall compositions" are intended to include the overall composition of the entire article, which may be differentiated from a "local composition" or "localized composition" which may differ from the bulk composition owing to the formation of crystalline and/or ceramic phases.

As also used herein, the terms "article," "glass-article," "ceramic-article," "glass-ceramics," "glass elements," "glass-ceramic article" and "glass-ceramic articles" may be used interchangeably, and in their broadest sense, to include any object made wholly or partly of glass and/or glass-ceramic material.

As used herein, a "glass state" refers to an inorganic amorphous phase material within the articles of the disclosure that is a product of melting that has cooled to a rigid condition without crystallizing. As used herein, a "glass-ceramic state" refers to an inorganic material within the articles of the disclosure which includes both the glass state and a "crystalline phase" and/or "crystalline precipitates" as described herein.

As used herein, "transmission", "transmittance", "optical transmittance" and "total transmittance" are used interchangeably in the disclosure and refer to external transmission or transmittance, which takes absorption, scattering and reflection into consideration. Fresnel reflection is not subtracted out of the transmission and transmittance values reported herein. In addition, any total transmittance values referenced over a particular wavelength range are given as an average of the total transmittance values measured over the specified wavelength range.

As used herein, "optical density units", "OD" and "OD units" are used interchangeably in the disclosure to refer to optical density units, as commonly understood as a measure of absorbance of the material tested, as measured with a spectrometer given by $OD=-\log(I/I_0)$ where $I_0$ is the intensity of light incident on the sample and I is the intensity of light that is transmitted through the sample. Further, the terms "OD/mm" or "OD/cm" used in this disclosure are normalized measures of absorbance, as determined by dividing the optical density units (i.e., as measured by an optical spectrometer) by the thickness of the sample (e.g., in units of millimeters or centimeters). In addition, any optical density units referenced over a particular wavelength range (e.g., 3.3 OD/mm to 24.0 OD/mm in UV wavelengths from 280 nm to 380 nm) are given as an average value of the optical density units over the specified wavelength range.

Referring now to FIG. 1, an article 10 is depicted that includes a substrate 14 having a glass and/or glass-ceramic composition according to the disclosure. The article 10 can be employed in any number of applications. For example, the article 10 and/or substrate 14 can be employed in the form of substrates, elements, covers and other elements in any number of optics related and/or aesthetic applications.

The substrate 14 defines or includes a pair of opposing primary surfaces 18, 22. In some examples of the article 10, the substrate 14 includes a compressive stress region 26. As shown in FIG. 1, the compressive stress region 26 extends from the primary surface 18 to a first selected depth 30 in the substrate 14. In some examples, the substrate 14 includes a comparable compressive stress region 26 that extends from the primary surface 18 to a second selected depth. Further, in some examples, multiple compressive stress regions 26 may extend from the primary surfaces 18, 22 and/or edges of the substrate 14. The substrate 14 may have a selected length and width, or diameter, to define its surface area. The substrate 14 may have at least one edge between the primary surfaces 18, 22 of the substrate 14 defined by its length and width, or diameter. The substrate 14 may also have a selected thickness. According to various examples, the substrate 14 may include a first portion 34 and a second portion 38. It will be understood that although described as including two portions, the substrate 14 may include any number of portions. As will be explained in greater detail below, the first portion 34 and the second portion 38 may exhibit different optical properties (e.g., transmittance, color, optical density, etc.) and/or different mechanical properties (e.g., depth of compression, strength, hardness, etc.). By altering the number of portions and optical properties of the various portions, various optical effects (e.g., gradient tints, gradient colors, patterns, etc.) may be achieved.

It will be understood that where a specific attribute, feature, functionality and/or property (e.g., optical or mechanical property) is described in connection with the article 10 generally, one, both or neither of the first portion 34 and the second portion 38 may include the feature, attribute and/or property. Further, it will be understood that while described herein as including "portions," such a description of the substrate 14 may simply be a manner of describing the optical change exhibited across the article 10 or substrate 14 and not necessarily indicative of a quantized region of the article 10 or substrate 14 exhibiting such a property.

As used herein, a "selected depth," (e.g., selected depth 30) "depth of compression" and "DOC" are used interchangeably to define the depth at which the stress in the substrate 14, as described herein, changes from compressive to tensile. DOC may be measured by a surface stress meter, such as an FSM-6000, or a scattered light polariscope (SCALP) depending on the ion exchange treatment. Where the stress in a substrate 14 having a glass or a glass-ceramic composition is generated by exchanging potassium ions into the glass substrate 14, a surface stress meter is used to measure DOC. Where the stress is generated by exchanging sodium ions into the glass substrate 10, SCALP is used to measure DOC. Where the stress in the substrate 14 having a glass or glass-ceramic composition is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates 14 is measured by a surface stress meter. As also used herein, the "maximum compressive stress" is defined as the maximum compressive stress within the compressive stress region 26 in the substrate 14. In some examples, the maximum compressive stress is obtained at or in close proximity to the one or more primary surfaces 18, 22 defining the compressive stress region 26. In other examples, the maximum compressive stress is obtained between the one or more primary surfaces 18, 22 and the selected depth 30 of the compressive stress region 26.

In some examples of the article 10, as depicted in exemplary form in FIG. 1, the substrate 14 is selected from a chemically strengthened alumino-boro-silicate glass or glass-ceramic. For example, the substrate 14 can be selected from chemically strengthened alumino-boro-silicate glass or glass-ceramic having a compressive stress region 26 extending to a first selected depth 30 of greater than 10 µm, with a maximum compressive stress of greater than 150 MPa. In further examples, the substrate 14 is selected from a chemically strengthened alumino-boro-silicate glass or glass-ceramic having a compressive stress region 26 extending to a first selected depth 30 of greater than 25 µm, with a maximum compressive stress of greater than 400 MPa. The substrate 14 of the article 10 may also include one or more compressive stress regions 26 that extend from one or more of the primary surfaces 18, 22 to a selected depth 30 (or depths) having a maximum compressive stress of greater than about 150 MPa, greater than 200 MPa, greater than 250 MPa, greater than 300 MPa, greater than 350 MPa, greater than 400 MPa, greater than 450 MPa, greater than 500 MPa, greater than 550 MPa, greater than 600 MPa, greater than 650 MPa, greater than 700 MPa, greater than 750 MPa, greater than 800 MPa, greater than 850 MPa, greater than 900 MPa, greater than 950 MPa, greater than 1000 MPa, and all maximum compressive stress levels between these values. In some examples, the maximum compressive stress is 2000 MPa or lower. In other examples, the compressive stress regions 26 have a maximum compressive stress from about 150 MPa to about 2000 MPa, or from about 150 MPa to about 1500 MPa, or from about 150 MPa to about 1000 MPa. Further, the compressive stress regions 26 can have any and all values and ranges between these specified maximum compressive stress values. In addition, the depth of compression (DOC) or first selected depth 30 can be set at 10 µm or greater, 15 µm or greater, 20 µm or greater, 25 µm or greater, 30 µm or greater, 35 µm or greater, and to even higher depths, depending on the thickness of the substrate 14 and the processing conditions associated with generating the compressive stress region 26. In some examples, the DOC is less than or equal to 0.3 times the thickness (t) of the substrate 14, for example 0.3 t, 0.28 t, 0.26 t, 0.25 t, 0.24 t, 0.23 t, 0.22 t, 0.21 t, 0.20 t, 0.19 t, 0.18 t, 0.15 t, or 0.10 t and all values therebetween.

As will be explained in greater detail below, the article 10 is formed from an as-batched composition and is cast in a glass state. The article 10 may later be annealed and/or thermally processed (e.g., heat treated) to form a glass-ceramic state having a plurality of ceramic or crystalline particles. It will be understood that depending on the casting technique employed, the volume of glass cast and the geometry of the casting, the article 10 may readily crystallize and become a glass-ceramic without additional heat treatment (e.g., essentially be cast into the glass-ceramic state). In examples where a post-forming thermal processing is employed, a portion, a majority, substantially all or all of the article 10 may be converted from the glass-state to the glass-ceramic state. For example, the first portion 34 and the second portion 38 may exhibit different quantities of crystallization and/or crystals of different sizes and/or chemistries. As such, although compositions of the article 10 may be described in connection with the glass state and/or the glass-ceramic state, the bulk composition of the article 10 may remain substantially unaltered when converted between the glass and glass-ceramic states, despite localized portions of the article 10 having a different composition (i.e., owing to the formation of the ceramic or crystalline precipitates). Further, it will be understood that while the compositions are described in terms of an as-batched state, one having ordinary skill in the art will recognize which constituents of the article 10 may volatize in the melting process (i.e., and therefore be less present in the article 10 relative to the as-batched composition) and others which will not.

According to various examples, the article 10 may include $Al_2O_3$, $SiO_2$, $B_2O_3$, $WO_3$, $MO_3$, Ag, Au, Cu, $V_2O_5$, $R_2O$ where $R_2O$ is one or more of $Li_2O$, $Na_2O$, $K_2O$, $Rb_2O$ and $Cs_2O$, RO where RO is one or more of MgO, CaO, SrO, BaO and ZnO and a number of dopants. Unless otherwise noted, glass compositions correspond to as-batched mole percentage (mol %) in a crucible for melting.

The article 10 may have from about 40 mol % to about 80 mol % $SiO_2$, or from about 50 mol % to about 75 mol % $SiO_2$ or from about 60 mol % to about 72 mol % $SiO_2$. For example, the article 10 may have about 42 mol %, about 44 mol %, about 46 mol %, about 48 mol %, about 50 mol %, about 52 mol %, about 54 mol %, about 56 mol %, about 58 mol %, about 60 mol %, about 62 mol %, about 64 mol %, about 66 mol %, about 68 mol %, about 70 mol %, about 72 mol %, about 74 mol %, about 76 mol % or about 78 mol % $SiO_2$. It will be understood that any and all values and ranges between the above-noted ranges of $SiO_2$ are contemplated.

The article 10 may include from about 1 mol % to about 20 mol % $Al_2O_3$, or from about 7 mol % to about 20 mol % $Al_2O_3$, or from about 1 mol % to about 15 mol % $Al_2O_3$, or from about 5 mol % to about 15 mol % $Al_2O_3$, or from about 7 mol % to about 15 mol % $Al_2O_3$, or from about 7 mol % to about 12 mol % $Al_2O_3$. For example, the article 10 may have about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol % or about 14 mol % $Al_2O_3$. It will be understood that any and all values and ranges between the above-noted ranges of $Al_2O_3$ are contemplated.

The article 10 may include $WO_3$ and/or $MoO_3$. The combined amount of $WO_3$ and $MoO_3$ is referred to herein as "$WO_3$ plus $MoO_3$" where it is understood that "$WO_3$ plus $MoO_3$" refers to $WO_3$ alone, $MoO_3$ alone, or a combination of $WO_3$ and $MoO_3$. For example, $WO_3$ plus $MoO_3$ may be from about 1 mol % to about 18 mol %, or from about 2 mol % to about 10 mol %, or from about 3.5 mol % to about 8 mol % or from about 3 mol to about 6 mol %. With respect to $MoO_3$, the article 10 may have from about 0 mol % to about 15 mol % $MoO_3$, or from about 0 mol % to about 7 mol % $MoO_3$, or from about 0 mol % to about 4 mol % $MoO_3$. For example, the article 10 may have about 1 mol %, about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol % $MoO_3$. With respect to $WO_3$, the article 10 may have from about 0 mol % to about 15 mol % $WO_3$, or from about 0 mol % to about 7 mol % $WO_3$, or from about 0 mol % to about 4 mol % $WO_3$. For example, the article 10 may have about 1 mol %, about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol % $WO_3$. It will be understood that any and all values and ranges between the above-noted ranges of $WO_3$ plus $MoO_3$, $WO_3$ and/or $MoO_3$ are contemplated.

The article 10 may include from about 3 mol % to about 50 mol % $B_2O_3$, or from about 5 mol % to about 50 mol % of $B_2O_3$, or from about 5 mol % to about 25 mol % $B_2O_3$, or from about 8 mol % to about 15 mol % $B_2O_3$. For example, the article 10 may include about 3 mol %, 4 mol %, 5 mol %, 10 mol %, 15 mol %, 20 mol %, 25 mol %, 30 mol %, 35 mol %, 40 mol %, 45 mol %, or about 50 mol % $B_2O_3$. It will be understood that any and all values and ranges between the above-noted ranges of $B_2O_3$ are contemplated.

The article 10 may include at least one alkali metal oxide. The alkali metal oxide may be represented by the chemical formula $R_2O$ where $R_2O$ is one or more of $Li_2O$, $Na_2O$, $K_2O$, $Rb_2O$, $Cs_2O$ and/or combinations thereof. The article 10 may have $R_2O$ from about 0 mol % to about 15 mol %, or from about 3 mol % to about 14 mol % or from about 7 mol % to about 12 mol % $R_2O$. For example, the article 10 may have about 1 mol %, about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol % or about 14 mol % $R_2O$. It will be understood that any and all values and ranges between the above-noted ranges of $R_2O$ are contemplated.

According to various examples, $R_2O$ minus $Al_2O_3$ (i.e., the difference between the amount of $R_2O$ and $Al_2O_3$) ranges from about from about −12 mol % to about 4 mol %, or from about −12 mol % to about 3.8 mol %, or from about −10 mol % to about 3.5 mol %, or from about −8 mol % to about 3 mol %, or from about −6 mol % to about 1.5 mol %. For example, the article 10 can include $R_2O$ minus $Al_2O_3$ of about −12 mol %, −11 mol %, −10 mol %, −9 mol %, −8 mol %, −7 mol %, −6 mol %, −5 mol %, −4 mol %, −3 mol %, −2 mol %, −1 mol %, 0 mol %, +1 mol %, +2 mol %, +3 mol %, or about +4 mol %. It will be understood that any and all values and ranges between the above-noted ranges of $R_2O$ minus $Al_2O_3$ are contemplated. The difference in $R_2O$ and $Al_2O_3$ specified herein influences the availability of excess alkali cations to interact with tungsten and/or molybdenum oxide, thereby modulating/controlling the formation of alkali tungsten bronzes (e.g. non-stoichiometric tungsten sub-oxides), stoichiometric alkali tungstates (e.g., $Na_2WO_4$), alkali molybdenum bronzes (e.g. non-stoichiometric molybdenum sub-oxides) and/or stoichiometric alkali molybdeates.

The article 10 may include at least one alkaline earth metal oxide and/or ZnO. The alkaline earth metal oxide may be represented by the chemical formula RO where RO is one or more of MgO, CaO, SrO, and BaO. The article 10 may include RO from about 0 mol % to about 15 mol % RO, or from about 3 mol % to about 14 mol % RO, or from about 0.01 mol % to about 2 mol % RO, or from about 0 mol % to about 0.5 mol % RO. For example, the article 10 may include about 0 mol %, about 1 mol %, about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol %, or about 15 mol % RO. The article 10 may include ZnO from about 0 mol % to about 15 mol % ZnO, or from about 3 mol % to about 14 mol % ZnO, or from about 0 mol % to about 0.5 mol % ZnO. It will be understood that any and all values and ranges between the above-noted ranges of RO and ZnO are contemplated. According to various examples, the amount of $R_2O$ may be greater than the amount of RO and/or ZnO. Further, the article 10 may be free of RO and/or ZnO.

The article 10 may include from about 0 mol % to about 0.5 mol % of $SnO_2$, or from about 0.05 mol % to about 2 mol % of $SnO_2$. For example, the article 10 can include about 0 mol %, about 0.01 mol %, about 0.05 mol %, about 0.1 mol %, about 0.5 mol %, about 1 mol %, about 1.5 mol %, or about 2 mol % of $SnO_2$. The article 10 may include from about 0.01 mol % to about 1.5 mol % Cu, or from about 0.05 mol % to about 1.0 mol % Cu or from about 0.1 mol % to about 0.5 mol % Cu. The article 10 may include from about 0.0001 mol % $V_2O_5$, or from about 0.0005 mol % to about 0.5 mol % $V_2O_5$, or from about 0.001 mol % to about 0.1 mol % $V_2O_5$ or from about 0.001 mol % to about 0.005 $V_2O_5$. The article 10 may include from about 0.05 mol % to about 1.5 mol % Ag, or from about 0.1 mol % to about 1.0 mol % Ag or from about 0.25 mol % to about 0.6 mol % Ag. It will be understood that any and all values and ranges between the above-noted ranges of $SnO_2$, Cu, $V_2O_5$ or Ag are contemplated. For example, the article 10 may include at least one of: (i) Au from about 0.001 mol % to about 0.5 mol %, (ii) Ag from about 0.025 mol % to about 1.5 mol %, and (iii) Cu from about 0.03 mol % to about 1.0 mol %. It will be understood that Ag, Au and/or Cu may exist within the article 10 at any oxidation state and/or in a combination of oxidation states in the above-noted mol % values.

According to various examples, the article 10 can further include at least one dopant selected from the group consisting of Ti, V, Cr, Mn, Fe, Co, Ni, Se, Nb, Mo, Tc, Ru, Rh, Pd, Cd, Te, Ta, Re, Os, Ir, Pt, Ti, Pb, Bi, Ce, Pr, Nd, Sm, Eu, Gd, Tb, Dy, Ho, Er, Tm, Yb, and/or Lu to alter the ultraviolet, visual, color and/or near-infrared absorbance. The dopants may have a concentration of from about 0.0001 mol % to about 1.0 mol % within the glass composition. In some examples, Ag, Au and/or Cu may be dopants.

It will be understood that each of the above noted compositions and composition ranges for $SiO_2$, $Al_2O_3$, $WO_3$, $MoO_3$, $WO_3$ plus $MoO_3$, $B_2O_3$, $R_2O$, RO, $V_2O_5$, Ag, Au, Cu, $SnO_2$, and dopants may be used with any other composition and/or composition range of the other constituents of the glass as outlined herein. For example, Tables 1, 2 and 3 provide exemplary composition ranges of the article 10 in an as-batched mol %.

TABLE 1

| Constituent | Min. | Max. |
| --- | --- | --- |
| $SiO_2$ | 40 | 80 |
| $Al_2O_3$ | 1 | 15 |
| $B_2O_3$ | 5 | 50 |
| $R_2O$ | 0 | 15 |
| RO | 0 | 2 |
| ZnO | 0 | 2 |
| $P_2O_5$ | 0 | 3 |
| $MoO_3$ | 0 | 15 |
| $WO_3$ | 1 | 15 |
| $SnO_2$ | 0 | 0.5 |
| Ag | 0 | 1.5 |
| Au | 0 | 0.5 |
| Cu | 0 | 1 |
| $CeO_2$ | 0 | 1 |
| $MoO_3$ plus $WO_3$ | 1 | 18 |
| $R_2O$ minus $Al_2O_3$ | −12 | 5 |

TABLE 2

| Constituent | Min. | Max. |
| --- | --- | --- |
| $SiO_2$ | 50 | 75 |
| $Al_2O_3$ | 5 | 15 |
| $B_2O_3$ | 6 | 25 |
| $R_2O$ | 3 | 14 |
| RO | 0 | 1 |
| ZnO | 0 | 1 |
| $P_2O_5$ | 0 | 2 |
| $MoO_3$ | 0 | 7 |
| $WO_3$ | 2 | 7 |
| $SnO_2$ | 0.01 | 0.4 |
| Ag | 0 | 1 |
| Au | 0 | 0.4 |
| Cu | 0 | 0.95 |
| $CeO_2$ | 0. | 0.5 |
| $MoO_3$ plus $WO_3$ | 2 | 8 |
| $R_2O$ minus $Al_2O_3$ | −8 | 3.5 |

TABLE 3

| Constituent | Min. | Max. |
| --- | --- | --- |
| $SiO_2$ | 60 | 72 |
| $Al_2O_3$ | 7 | 12 |
| $B_2O_3$ | 8 | 15 |
| $R_2O$ | 7 | 12 |
| RO | 0 | 0.5 |
| ZnO | 0 | 0.5 |
| $P_2O_5$ | 0 | 1.5 |
| $MoO_3$ | 0 | 4 |
| $WO_3$ | 3 | 4 |
| $SnO_2$ | 0.05 | 0.3 |
| Ag | 0 | 0.5 |
| Au | 0 | 0.3 |
| Cu | 0 | 0.85 |
| $CeO_2$ | 0 | 0.25 |
| $MoO_3$ plus $WO_3$ | 3 | 6 |
| $R_2O$ minus $Al_2O_3$ | 0 | 0.75 |

Table 4 provides a list of exemplary properties of the article 10 in an un-doped state (e.g., where Cu, Ag, Au and V are considered dopants and no other dopants are included). The data of Table 4 corresponds to the article 10 having the composition outlined in as example 31 below.

TABLE 4

| Property | Value |
| --- | --- |
| Strain Point (° C.) | 455° |
| Anneal Point (° C.) | 499.6 |
| Softening Point (° C.) | 723.2 |
| Expansion ($10^{-7}$/° C.) | 60.3 |
| Density at 4° C. (g/cm$^3$) | 2.509 |
| Liquidus Temperature (° C.) | 970 |

Table 5 provides exemplary viscosity values at standard points for of the article 10 in an un-doped state (e.g., where Cu, Ag, Au and V are considered dopants and no other dopants are included). The data of Table 5 corresponds to the article 10 having the composition outlined in as example 31 below.

TABLE 5

| Temperature (° C.) | Viscosity (Poise) |
| --- | --- |
| 974.8 | 125833 |
| 1011.8 | 67629 |

TABLE 5-continued

| Temperature (° C.) | Viscosity (Poise) |
|---|---|
| 1049.3 | 37407 |
| 1087.1 | 21447 |
| 1129.4 | 11992 |
| 1165.9 | 7493 |
| 1203.3 | 4741 |
| 1240.8 | 3054 |
| 1278.9 | 2007 |
| 1317.5 | 1323 |
| 1356.8 | 886 |
| 1416.5 | 524 |
| 1457.6 | 357 |
| 1499.8 | 246 |
| 1527.7 | 200 |

As explained below, conventional formation of tungsten-, molybdenum-, or mixed tungsten molybdenum-containing alkali glasses has been hampered by the separation of the melt constituents during the melting process. The separation of the glass constituents during the melting process resulted in a perceived solubility limit of the oxides of tungsten and molybdenum within the molten glass, and therefore of articles cast from such melts. Conventionally, when a tungsten, molybdenum, or mixed tungsten-molybdenum-doped-alkali-alumino-borosilicate glass was formulated such that it was even slightly peralkaline (e.g., $R_2O$ minus $Al_2O_3$=about 0.25 mol % or greater), the melt formed both a glass and a dense alkali tungstate, alkali molybdate, and or mixed alkali tungsto-molybdate liquid second phase. While the concentration of the alkali tungstate second phase could be minimized by thorough mixing, melting at a high temperature, and employing a small batch size (~1000 g), it could not be fully eliminated leading to formation of a deleterious second crystalline phase. It is believed that the formation of this alkali tungstate phase occurs in the initial stages of the melt, where tungsten and/or molybdenum oxide reacts with "free" or "unbound" alkali carbonates. Due to the high density of alkali tungstate and/or alkali molybdate relative to the borosilicate glass that is formed, it rapidly segregates and/or stratifies, pooling at the bottom of the crucible and does not rapidly solubilize in the glass due to the significant difference in density. As the $R_2O$ constituents may provide beneficial properties to the glass composition, simply decreasing the presence of the $R_2O$ constituents within the melt may not be desirable. As the tungsten segregates, it is difficult to saturate the glass with it, and accordingly, it is difficult to get it to crystallize from the glass and form the precipitates as described herein.

It has been discovered by the inventors of the present disclosure that a homogeneous single-phase W or Mo-containing peralkaline melt may be obtained through the use of "bound" alkalis. For purposes of this disclosure, "bound" alkalis are alkali elements which are bonded to oxygen ions which are bound to aluminum, boron, and/or silicon atoms, while "free" or "unbound" alkalis are alkali carbonates, nitrates, or sulfates, which are not bound to an oxygen ion already bound to silicon, boron, or aluminum, atoms. Exemplary bound alkalis may include feldspar, nepheline, borax, spodumene, other sodium or potassium feldspars, alkali-aluminum-silicates and/or other oxide compositions containing an alkali and one or more aluminum and/or silicon atoms. By introducing the alkali in the bound form, the alkalis may not react with the W or Mo present in the melt to form the dense alkali tungstate and/or alkali molybdate liquid. Moreover, this change in batch material may allow the melting of strongly peralkaline compositions (e.g., $R_2O$—$Al_2O_3$=about 2.0 mol % or more) without the formation of an alkali tungstate and/or alkali molybdate second phase. This has also allowed the melt temperature and mixing method to be varied and still produce a single-phase homogeneous glass. It will be understood that as the alkali tungstate phase and the borosilicate glass are not immiscible, and prolonged stirring of the molten mixture may also allow mixing of the two phases to cast a single phase article.

Once the glass melt is cast and solidified into the glass state article, the article 10 may be annealed, heat treated or otherwise thermally processed to form or modify a crystalline phase within the article 10. Accordingly, the article 10 may be transformed from the glass-state to the glass-ceramic state. The crystalline phase of the glass-ceramic state may take a variety of morphologies. According to various examples, the crystalline phase is formed as a plurality of precipitates within the heat treated region of the article 10. As such, the precipitates may have a generally crystalline structure. The glass-ceramic state may include two or more crystalline phases.

As used herein, "a crystalline phase" refers to an inorganic material within the articles of the disclosure that is a solid composed of atoms, ions or molecules arranged in a pattern that is periodic in three dimensions. Further, "a crystalline phase" as referenced in this disclosure, unless expressly noted otherwise, is determined to be present using the following method. First, powder x-ray diffraction ("XRD") is employed to detect the presence of crystalline precipitates. Second, Raman spectroscopy ("Raman") is employed to detect the presence of crystalline precipitates in the event that XRD is unsuccessful (e.g., due to size, quantity and/or chemistry of the precipitates). Optionally, transmission electron microscopy ("TEM") is employed to visually confirm or otherwise substantiate the determination of crystalline precipitates obtained through the XRD and/or Raman techniques. In certain circumstances, the quantity and/or size of the precipitates may be low enough that visual confirmation of the precipitates proves particularly difficult. As such, the larger sample size of XRD and Raman may be advantageous in sampling a greater quantity of material to determine the presence of the precipitates.

The crystalline precipitates may have a generally rod-like or needle-like morphology. The precipitates may have a longest length dimension of from about 1 nm to about 500 nm, or from about 1 nm to about 400 nm, or from about 1 nm to about 300 nm, or from about 1 nm to about 250 nm, or from about 1 nm to about 200 nm, or from about 1 nm to about 100 nm, or from about 1 nm to about 75 nm, or from about 1 nm to about 50 nm, or from about 5 nm to about 50 nm, or from about 1 nm to about 25 nm, or from about 1 nm to about 20 nm, or from about 1 nm to about 10 nm. The size of the precipitates may be measured using Electron Microscopy. For purposes of this disclosure, the term "Electron Microscopy" means visually measuring the longest length of the precipitates first by using a scanning electron microscope, and if unable to resolve the precipitates, next using a transmission electron microscope. As the crystalline precipitates may generally have a rod-like or needle-like morphology, the precipitates may have a width of from about 5 nm to about 50 nm, or from about 2 nm to about 30 nm, or from about 2 nm to about 10 nm, or from about 2 nm to about 7 nm. It will be understood that the size and/or morphology of the precipitates may be uniform, substantially uniform or may vary. Generally, peraluminous compositions of the article 10 may produce precipitates having a needle-like shape with a length of from about 100 nm to about 250 nm and a width of from about 5 nm to about 30 nm. Peraluminous compositions are compositions that have a molecular proportion of aluminum oxide higher than the combination of sodium oxide, potassium oxide and calcium oxide. Peralkaline compositions of the article 10 may produce needle-like precipitates having a length of from about 10 nm to about 30 nm and a width of from about 2 nm to about 7 nm. Ag, Au and/or Cu containing examples of the article 10 may produce rod-like precipitates having a length of from about 2 nm to about 20 nm and a width, or diameter, of from about 2 nm to about 10 nm. A volume fraction of the crystalline phase in the article 10 may range from about 0.001% to about 20%, or from about 0.001% to about 15%, or from about 0.001% to about 10%, or from about 0.001% to about 5%, or from about 0.001% to about 1%.

The relatively small size of the precipitates may be advantageous in reducing the amount of light scattered by the precipitates leading to high optical clarity of the article 10 when in the glass-ceramic state. As will be explained in greater detail below, the size and/or quantity of the precipitates may be varied across the article 10 such that different portions of the article 10 may have different optical properties. For example, portions of the article 10 where the precipitates are present may lead to changes in the absorbance, color, reflectance and/or transmission of light, as well as the refractive index as compared to portions of the article 10 where different precipitates (e.g., size and/or quantity) and/or no precipitates are present. As such, the first portion 34 and the second portion 38 may exhibit differences in the absorbance, color, reflectance and/or transmission of light, as well as the refractive index.

The precipitates may be composed of the oxides of tungsten and/or molybdenum. The crystalline phase includes an oxide, from about 0.1 mol % to about 100 mol % of the crystalline phase, of at least one of: (i) W, (ii) Mo, (iii) V and an alkali metal cation, and (iv) Ti and an alkali metal cation. Without being bound by theory, it is believed that during thermal processing (e.g., heat treating) of the article 10, tungsten and/or molybdenum cations agglomerate to form crystalline precipitates thereby transforming the glass state into the glass-ceramic state. The molybdenum and/or tungsten present in the precipitates may be reduced, or partially reduced. For example, the molybdenum and/or tungsten within the precipitates may have an oxidation state of between 0 and about +6, or from about +4 and about +6, or from about +5 and about +6. According to various examples, the molybdenum and/or tungsten may have a +6 oxidation state. For example, the precipitates may have the general chemical structure of $WO_3$ and/or $MoO_3$. The precipitates may be known as non-stoichiometric tungsten suboxides, non-stoichiometric molybdenum suboxides, "molybdenum bronzes" and/or "tungsten bronzes." One or more of the above-noted alkali metals and/or dopants may be present within the precipitates. Tungsten and/or molybdenum bronzes are a group of non-stoichiometric tungsten and/or molybdenum sub-oxides that takes the general chemical form of $M_xWO_3$ or $M_xMoO_3$, where M=H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, and U, and where $0<x<1$. The structures $M_xWO_3$ and $M_xMoO_3$ are considered to be a solid-state defect structure in which holes (vacancies and/or interstices) in a reduced $WO_3$ or $MoO_3$ network are randomly occupied by M atoms, which are dissociated into $M^+$ cations and free electrons. Depending on the concentration of "M," the material properties can range from metallic to semiconducting, thereby allowing a variety of optical absorption and electronic properties to be tuned. It will be understood that mixed tungsten and molybdenum bronzes may also be formed. For example, mixed tungsten and molybdenum bronzes $M'_xM''''O_3$, where M' is an alkali (e.g., Li, Na, K, Rb, Cs), $0<x<1$, and $M''''O_3$ is a mixture of $WO_3$ and $MoO_3$.

A portion, a majority, substantially all or all of the article 10 may be thermally processed to form the precipitates. For example, the first portion 34 and the second portion 38 may be processed differently or one portion (e.g., the first portion 34) may not be thermally processed while the other portion (e.g., the second portion 38) is thermally processed. Thermal processing techniques may include, but are not limited to, a furnace (e.g., a heat treating furnace), a laser and/or other techniques of locally and/or bulk heating of the article 10. It will be understood that thermal processing also encompasses localized cooling (e.g., through heat sinks and/or cold jets of gas) of regions or areas of the substrate 14 while other areas or regions of the substrate 14 are heated. While undergoing thermal processing, the crystalline precipitates internally nucleate within the article 10 in a homogenous manner where the article 10 is thermally processed to form the glass-ceramic state. As such, in some examples, the article 10 may include both glass and glass-ceramic portions. In examples where the article 10 is thermally processed in bulk (e.g., the whole article 10 is placed in a furnace), the precipitates may homogenously form throughout the article 10. In other words, the precipitates may exist from a surface of the article 10 throughout the bulk of the article 10 (i.e., greater than about 10 μm from the surface). In examples where the article 10 is thermally processed locally (e.g., via a laser), the precipitates may only be present where the thermal processing reaches a sufficient temperature (e.g., at the surface and into the bulk of the article 10 proximate the heat source). It will be understood that the article 10 may undergo more than one thermal processing to produce the precipitates. Additionally or alternatively, thermal processing may be utilized to remove and/or alter precipitates which have already been formed (e.g., as a result of previous thermal processing). For example, thermal processing may result in the decomposition of precipitates and/or the alteration of their structure, size and/or chemistry. Thermal processing may also include contacting one or more heat sinks, infrared blocking agents and/or other items configured to speed or delay heating and/or cooling of portions of the article 10. Such changes in the heating and/or cooling rate of the substrate 14 may affect the quantity, size and/or chemistry of the crystalline precipitates which may lead to changes in optical properties between the first portion 34 and the second portion 38 as explained in greater detail below.

According to various examples, the article 10 may be polychromatic. For purposes of this disclosure, the term "polychromatic" means a material which is capable of exhibiting different colors based on thermal treatments applied to it. $WO_3$ has no absorption of NIR wavelengths and only weak absorbance of visible wavelengths due to its wide band gap (e.g., about 2.62 eV) and lack of free carriers (e.g., electrons). With the insertion (termed 'intercalation') of dopant ions (e.g., $NH_4^+$, $Li^+$, $Na^+$, $K^+$, $Rb^+$, $Cs^+$, etc.), part of tungsten atoms in $WO_3$ are reduced from $W^{+6}$ to $W^{+5}$, resulting in free electrons within the crystal. These electrons occupy conduction bands (e.g., free electrons) and localized states in bandgaps (e.g., trapped electrons). As a result, the doped $WO_3$ (tungsten bronzes) acquires the ability of blocking NIR Over a wide wavelength range (e.g., $\lambda>1100$ nm) by absorbing NIR whose photon energy is lower than 0.7 eV through localized surface plasmon resonance and insulating NIR whose photon energy is near 1.4 eV through a small polaron mechanism. It will be understood that the same manner of doping and its effects are present in compositions including $MoO_3$ as well as compositions with both $WO_3$ and $MoO_3$.

Conventional glass compositions which utilize Ag, Au and/or Cu rely on the formation of nanoscale metallic precipitates to generate colors. Ag, Au and/or Cu cations can also intercalate into $WO_3$ and $MoO_3$ forming silver, gold and/or copper tungsten bronzes and/or silver, gold and/or copper molybdenum bronzes which may allow the article 10 exhibit polychromatic optical properties. Surprisingly, with the addition of a small concentration of Ag, Au and/or Cu to $M_xWO_3$ and/or $M_xMoO_3$ containing articles 10, a variety of colors (e.g., red, orange, yellow, green, blue, various browns and/or combinations thereof) could be produced by thermally processing the material at different times and temperatures. This result was quite unexpected because post-formation optical testing of the resultant articles 10 did not show evidence that the colors produced were simply summations of the optical absorption from the alkali tungsten and/or molybdenum bronzes phase (e.g., blue or green color) and absorbance characteristic of metallic nanoparticles (e.g., metallic $Ag^0$, $Au^0$ and/or $Cu^0$). Further analysis demonstrated that the color tunability was not due to the formation of ensembles of metallic nanoparticles that template atop a crystalline phase (e.g., $M_xWO_3$ or $M_xMoO_3$). For example, transmission electron microscopy revealed that the total volume fraction of the tungsten and/or molybdenum-containing crystalline phase, the crystallite size, shape, and aspect ratio remained constant irrespective of the color. Similarly, Raman spectroscopy detected tungsten and/or molybdenum bronze phases, but not the presence of metallic nanoparticles of any shape or size. As such, the resultant color and polychromatic nature of the article 10 does not manifest from some change in the tungsten and/or molybdenum-containing crystallite precipitate size.

In view of the above discussion, it is believed that the origin of color tunability in these polychromatic articles 10 is due to the change in the band gap energy of the doped tungsten and/or molybdenum oxide precipitates, arising from the concentration of intercalated alkali cations, as well as Ag, Au and/or Cu dopant metal cations, into the precipitates to form a pure alkali, mixed alkali-metal, and/or a pure metal tungsten and/or molybdenum bronzes of varying stoichiometry. Hence, examples of the polychromatic articles 10 have a plurality of crystalline precipitates that include non-stoichiometric tungsten, molybdenum and/or mixed molybdenum suboxides, some or all of which are intercalated with dopant cations (e.g., transition metals such as Ag, Au and/or Cu) and/or alkali metal ions. Changes in the band gap energy of the precipitates are due to its stoichiometry and in-turn is largely independent of crystallite size. Therefore, doped $M_xWO_3$ or $M_xMoO_3$ precipitates can remain the same size and/or shape, yet could provide the article 10 with many different colors depending on the dopant "M" identity and concentration "x". Further, it is believed that the thermal processing time and temperature control the stoichiometry "x" and possibly the identity of "M." For example, at relatively low temperatures, blue and green colors were observed that are characteristic of a $M_xWO_3$ and/or $M_xMoO_3$ bronze, where M=an alkali and 0.1<x<0.4. At temperatures above where these 'blue bronzes' form, colors such as yellow, red, and orange are formed, that suggest that "x" in $M_xWO_3$ is >0.4 and approaches 1 with increasing heat treatment time.

As such, the polychromatic nature, or color tunability, is a function of the concentration and identity of "M" in $M_xWO_3$ and $M_xMoO_3$ when M is something else other than sodium (i.e., x≠Na), or M is a combination of species: H, Li, Na, K, Rb, Cs, Mg, Ca, Sr, Sn, P, S, Ti, V, Cr, Mn, Fe, Co, Ni, Cu, Ga, Se, Zr, Nb, Ru, Rh, Pd, Ag, Cd, In, Sb, Te, La, Ce, Pr, Nd, Sm, Eu, Gd, Tb, Dy, Ho, Er, Tm, Yb, Lu, Ta, Os, Ir, Pt, Au, Tl, Pb, Bi, and/or U. The resultant color is due to the total dopant concentration x and also the identities of M (i.e., species with different electron densities, but the same charge can produce different optical responses). As will be understood, some of the species listed can only intercalate up to some x value (i.e., a narrower range of x than 0≤x≤1). This may be due to the cation size and charge. For example, red, yellow and/or orange colors can be obtained from non-stoichiometric tungstate compounds containing divalent cations M' where M' is one of MgO, CaO, SrO, BaO, ZnO, of the form $M'_{2-x}WO_4$ (where 0<x<1).

The thermal processing of the article 10 to develop the precipitates and/or generate color and/or optical absorbance may be accomplished in a single step or through multiple steps. For example, the generation of colors exhibited by the article 10 (e.g., which starts with the formation of a $WO_3$ and/or $MoO_3$ precipitates followed by the partial reduction of that crystallite with the simultaneous intercalation of a dopant species (e.g., an Ag, Au and/or Cu cation into the crystal)) can be completed in a single heat treatment after immediately after the article 10 is formed, or at a later point. For example, the article 10 may be cast and then processed into a final form (e.g., lens blanks or other optical or aesthetic elements) and then annealed at a temperature just below where color is generated (e.g., intercalation of the Ag, Au and/or Cu ions into the precipitates). This annealing may start the clustering of $WO_3$ and/or $MoO_3$, and then a secondary thermal processing may occur at an elevated temperature to allow further crystallization and the partial reduction of the $WO_3$ and/or $MoO_3$ crystals and intercalation of Ag, Au, Cu, and/or other species to generate color.

The thermal processing of the article 10, which generates the precipitates and/or intercalates the dopants into the precipitates, may occur under a variety of times and temperatures. It will be understood that thermal processing of the article 10 is carried out in an inert atmosphere (e.g., $N_2$ and/or air) unless otherwise noted. In examples where the article 10 is thermally processed in a furnace, the article 10 may be placed in the furnace at room temperature with a controlled ramping in temperature and/or may be "plunged" into a furnace already at an elevated temperature. The thermal processing may occur at a temperature of from about 400° C. to about 1000° C., or from about 400° C. to about 700° C., or from about 450° C. to about 650° C. For example, the second thermal processing may take place at a temperature of about 400° C., or about 425° C., or about 450° C., or about 475° C., or about 500° C., or about 505° C., or about 510° C., or about 515° C., or about 520° C., or about 525° C., or about 530° C., or about 535° C., or about 540° C., or about 545° C., or about 550° C., or about 555° C., or about 560° C., or about 565° C., or about 570° C., or about 575° C., or about 580° C., or about 585° C., or about 590° C., or about 595° C., or about or about 600° C., or about 605° C., or about 610° C., or about 615° C., or about 620° C., or about 625° C., or about 630° C., or about 635° C., or about 640° C., or about 645° C., or about 650° C., or about 655° C., or about 660° C., or about 665° C., or about 670° C., or about 675° C., or about 680° C., or about 685° C., or about 690° C., or about 695° C., or about 700° C. It will also be understood that any and all values and ranges between these specified thermal processing temperatures are contemplated for article 10.

The thermal processing may be carried out for a time period of from about 1 second to about 24 hours, or from about 5 minutes to about 500 minutes, or from about 5 minutes to about 300 minutes. For example, the thermal processing may be carried out for about 1 second, or about 30 seconds, or about 45 seconds, or about 1 minute, or about 2 minutes, or about 5 minutes, or about 10 minutes, or about 15 minutes, or about 20 minutes, or about 25 minutes, or about 30 minutes, or about 35 minutes, or about 40 minutes, or about 45 minutes, or about 50 minutes, or about 55 minutes, or about 60 minutes, or about 65 minutes, or about 70 minutes, or about 75 minutes, or about 80 minutes, or about 85 minutes, or about 90 minutes, or about 95 minutes, or about 100 minutes, or about 105 minutes, or about 110 minutes, or about 115 minutes, or about 120 minutes, or about 125 minutes, or about 130 minutes, or about 135 minutes, or about 140 minutes, or about 145 minutes, or about 150 minutes, or about 155 minutes, or about 160 minutes, or about 165 minutes, or about 170 minutes, or about 175 minutes, or about 180 minutes, or about 185 minutes, or about 190 minutes, or about 195 minutes, or about 200 minutes, or about 205 minutes, or about 210 minutes or about 215 minutes, or about 220 minutes, or about 225 minutes, or about 230 minutes, or about 235 minutes, or about 240 minutes, or about 245 minutes, or about 250 minutes, or about 255 minutes, or about 300 minutes. It will be understood that thermal processing may be carried out for significantly longer times upwards of about 6 hours or more, 7 hours or more, 8 hours or more, 9 hours or more, 10 hours or more, 11 hours or more, 12 hours or more, 13 hours or more, 14 hours or more or 15 hours or more. It will be understood that based on the heat and/or cooling configuration of the article 10 and substrate 14, the first portion 34 and the second portion 38 may each be held at different temperatures for different amount of times. It will also be understood that any and all values and ranges between these specified thermal processing durations are contemplated for article 10.

In some examples, the article 10 may then be cooled to a lower temperature at a rate of about 0.1° C. per minute to about 100° C. per minute, or about 0.1° C. per minute to about 50° C. per minute, or from about 0.1° C. per minute to about 10° C. per minute. For example, article 10 may be cooled at a lower temperature at a rate of about 0.1° C. per minute, or about 0.5° C. per minute, or about 1° C. per minute, or about 1.5° C. per minute, or about 2° C. per minute, or about 3° C. per minute, or about 4° C. per minute, or about 5° C. per minute, or about 6° C. per minute, or about 7° C. per minute, or about 8° C. per minute, or about 9° C. per minute, or about 10° C. per minute, or about 20° C. per minute, or about 30° C. per minute, or about 40° C. per minute, or about 50° C. per minute, or about 60° C. per minute, or about 70° C. per minute, or about 80° C. per minute, or about 90° C. per minute, or about 100° C. per minute. It will be understood that different portions of the article 10, such as first portion 34 and second portion 38, may be cooled at different rates as explained in greater detail below. For example, the first portion 34 and the second portion 38 may be cooled at different rates to produce different optical and/or mechanical properties across the substrate 14. It will also be understood that any and all values and ranges between these specified thermal processing cooling rates are contemplated for article 10.

The lower temperature may be from about room temperature (e.g., 23° C.) to about 500° C., or from about room temperature to about 400° C., or from about 100° C. to about 400° C. For example, the lower temperature may be about 23° C., about 50° C., about 75° C., about 100° C., about 125° C., about 150° C., about 175° C., about 200° C., about 225° C., about 250° C., about 275° C., about 300° C., about 325° C., about 350° C., about 375° C., about 400° C., or about 425° C., or about 450° C., or about 470° C., or about 500° C. It will be understood that the article 10 may undergo a multistage thermal processing using one or more of the above noted time and temperatures. It will also be understood that any and all values and ranges between these specified thermal processing lower temperatures are contemplated for article 10.

As explained above, additionally or alternatively to the use of a furnace, the article 10 may be thermally processed through the use of laser and/or other localized heat source. One example of a localized heat source may include a preheated heat sink which is placed onto the article 10 and/or substrate 14 which to locally heat one or more of the first portion 34 and the second portion 38. In will be understood that the substrate 14 may be at room temperature or preheated prior to the placement of the preheated heat sink. Such an example may be advantageous in producing a localized color or polychromatic effect. The laser and/or localized heat source may supply sufficient thermal energy to create the precipitates and/or intercalate one or more of Ag, Au and/or Cu into the precipitates to generate localized color. The laser and/or other heat source may be rastered or guided across the article 10 to preferentially create color and/or varied optical properties across the article 10. The intensity and/or speed of the laser and/or localized heat source may be adjusted as it is moved across the article 10 such that various portions of the article 10 exhibit different colors or absorbance. Such features may be advantageous in creating indicia, symbols, text, numbers and/or pictures in the article 10. Further, such a feature may be advantageous in creating a gradient tint.

As explained above, depending on the composition of the article 10 and the thermal processing it undergoes, the article 10 may exhibit a variety of colors. Specifically, the article 10 may exhibit the following colors: blue, green, brown, amber, yellow, orange, red, oxblood red, shades of neutral gray and bronze-brown colors and/or combinations thereof. It will be understood that any of these colors and/or color combinations may be generated in bulk across the article 10 and/or in localized portions of the article 10 (e.g., first portion 34 and second portion 38) as explained above. The color of the article 10 may be expressed in terms of a three-dimensional L*a*b* color space where L* *is lightness and a* and b* for the color opponents green-red and blue-yellow, respectively. Additionally or alternatively, the color of the article 10 may also be expressed in values of X and Y where Y is luminance and X is a mix (e.g., a linear combination) of cone response curves chosen to be nonnegative. Unless otherwise specified the L*, a*, b* and X, Y color coordinates, with specular component included, are collected under D65-10 illumination with an X-Rite colorimeter in transmittance mode on polished 0.5 mm thick flats cut from rolled sheet after heat treatment. In other words, the color coordinates are transmitted color coordinates. The article 10 may exhibit an L* value of from about 6 to about 90, or from about 6 to about 85, or from about 4 to about 86, or from about 14 to about 90, or from about 21 to about 88, or from about 4.5 to about 81, or from about 39 to about 90, or from about 8 to about 90, or from about 15 to about 91, or from about 28 to about 92, or from about 16 to about 81, or from about 49 to about 89, or from about 41 to about 96 or from about 15.6 to about 96. The article 10 may exhibit an a* value from about −18.6 to about 49, or from about −13 to about 41, or from about −9 to about 38, or from about −14 to about 31, or from about −11 to about 36, or from about −12 to about 29 or from about −12 to about 26. The article 10 may exhibit a b* value of from about −7.8 to about 53.5, or from about −2 to about 63, or from about 2 to about 70, or from about 6 to about 70, or from about 1 to about 68, or from about 1 to about 65, or from about 4 to about 49, or from about 1 to about 37, or from about 4 to about 24 or from about 5 to about 30. The article 10 may exhibit an X value of from about 0.24 to about 0.65, or from about 0.31 to about 0.66, or from about 0.27 to about 0.62, or from about 0.29 to about 0.66, or from about 0.30 to about 0.65, or from about 0.29 to about 0.60, or from about 0.31 to about 0.57 or from about 0.3 to about 0.48. The article 10 may exhibit a Y value of from about 0.32 to about 0.43, or from about 0.34 to about 0.40, or from about 0.33 to about 0.43 or from about 0.35 to about 0.38. It will be understood that all values and ranges between the above-noted ranges and values are contemplated for L*, a*, b*, X and Y. Further, it will be understood that any of the L*, a*, b*, X and Y values may be used in conjunction with any of the other L*, a*, b*, X and Y values.

The article 10 may exhibit an absorbance over certain wavelength bands of electromagnetic radiation. It will be understood that as the formation of the crystalline precipitates increases absorbance of the substrate 14, any and all manners described above in connection with generating color may also equally alter absorbance of the substrate 14. The absorbance may be expressed in terms of optical density per millimeter (OD/mm). As understood by those in the art, optical density is the log of the ratio of light intensity exiting the article 10 to light intensity entering the article 10. Absorbance data may be collected using a UV/VIS/NIR spectrophotometer in conformance with the measurement rules according to ISO 15368.

Over a wavelength range of from about 280 nm to about 380 nm, the first portion 34 and/or the second portion 38, of the article 10 may have an absorbance of 0.5 OD/mm to about 20 OD/mm, or from about 0.5 OD/mm to about 10 OD/mm, or from about 0.6 OD/mm to about 8 OD/mm, or from about 1 OD/mm to about 8 OD/mm, or from about 4 OD/mm to about 8 OD/mm. For example, the article 10 may have an absorbance over a wavelength of from about 280 nm to about 380 nm of about 0.5 OD/mm, or about 1.0 OD/mm, or about 1.5 OD/mm, or about 2.0 OD/mm, or about 2.5 OD/mm, or about 3.0 OD/mm, or about 3.5 OD/mm, or about 4.0 OD/mm, or about 4.5 OD/mm, or about 5.0 OD/mm, or about 5.5 OD/mm, or about 6.0 OD/mm, or about 6.5 OD/mm, or about 7.0 OD/mm, or about 7.5 OD/mm, or about 8.0 OD/mm, or about 8.5 OD/mm, or about 9.0 OD/mm, or about 9.5 OD/mm, or about 10.0 OD/mm or greater. It will be understood that any and all values and ranges between the values listed above are contemplated.

Over a wavelength range of from about 380 nm to about 400 nm, the first portion 34 and/or the second portion 38 of the article 10 may have an absorbance of about 0.2 OD/mm to about 20 OD/mm, or about 0.2 OD/mm to about 10 OD/mm, or from about 0.2 OD/mm to about 8 OD/mm, or from about 1.2 OD/mm to about 8 OD/mm, or from about 1.8 OD/mm to about 7.5 OD/mm. For example, the article 10 may have an absorbance over a wavelength of from about 380 nm to about 400 nm of about 0.5 OD/mm, or about 1.0 OD/mm, or about 1.5 OD/mm, or about 2.0 OD/mm, or about 2.5 OD/mm, or about 3.0 OD/mm, or about 3.5 OD/mm, or about 4.0 OD/mm, or about 4.5 OD/mm, or about 5.0 OD/mm, or about 5.5 OD/mm, or about 6.0 OD/mm, or about 6.5 OD/mm, or about 7.0 OD/mm, or about 7.5 OD/mm, or about 8.0 OD/mm, or about 8.5 OD/mm, or about 9.0 OD/mm, or about 9.5 OD/mm, or about 10.0 OD/mm or greater. It will be understood that any and all values and ranges between the values listed above are contemplated.

Over a wavelength range of from about 400 nm to about 700 nm, the first portion 34 and/or the second portion 38 of the article 10 may have an absorbance of 0.1 OD/mm to about 6 OD/mm, or from about 0.1 OD/mm to about 4.4 OD/mm, or from about 0.6 OD/mm to about 4.2 OD/mm. For example, the article 10 may have an absorbance over a wavelength of from about 400 nm to about 700 nm of about 0.5 OD/mm, or about 1.0 OD/mm, or about 1.5 OD/mm, or about 2.0 OD/mm, or about 2.5 OD/mm, or about 3.0 OD/mm, or about 3.5 OD/mm, or about 4.0 OD/mm, or about 4.5 OD/mm, or about 5.0 OD/mm, or about 5.5 OD/mm or about 6.0 OD/mm. It will be understood that any and all values and ranges between the values listed above are contemplated.

Over a wavelength range of from about 700 nm to about 2000 nm, the first portion 34 and/or the second portion 38 of the article 10 may have an absorbance of 0.1 OD/mm to about 5.7 OD/mm, or from about 0.1 OD/mm to about 5.8 OD/mm or from about 0.1 OD/mm to about 5.2 OD/mm. For example, over a wavelength range of from about 700 nm to about 2000 nm, the article 10 may have an absorbance of about 0.2 OD/mm, or about 0.4 OD/mm, or about 0.6 OD/mm, or about 0.8 OD/mm, or about 1.0 OD/mm, or about 1.2 OD/mm, or about 1.4 OD/mm, or about 1.6 OD/mm, or about 1.8 OD/mm, or about 2.0 OD/mm, or about 2.2 OD/mm, or about 2.4 OD/mm, or about 2.6 OD/mm, or about 2.8 OD/mm, or about 3.0 OD/mm, or about 3.2 OD/mm, or about 3.4 OD/mm, or about 3.6 OD/mm, or about 3.8 OD/mm, or about 4.0 OD/mm, or about 4.2 OD/mm, or about 4.4 OD/mm, or about 4.6 OD/mm, or about 4.8 OD/mm, or about, or about 5.0 OD/mm, or about 5.2 OD/mm, or about 5.4 OD/mm, or about 5.6 OD/mm or about 5.8 OD/mm. It will be understood that any and all values and ranges between the values listed above are contemplated.

Over a wavelength range of from about 400 nm to about 1500 nm, the article 10 may have a difference in absorbance between the first portion 34 and the second portion 38 of about 0.04 OD/mm or greater, or about 0.05 OD/mm or greater, or about 0.10 OD/mm or greater, or about 0.15 OD/mm or greater, or about 0.20 OD/mm or greater, or about 0.25 OD/mm or greater, or about 0.30 OD/mm or greater, or about 0.35 OD/mm or greater, or about 0.40 OD/mm or greater, or about 0.45 OD/mm or greater, or about 0.49 OD/mm or greater, or about 0.50 OD/mm or greater, or about 0.55 OD/mm or greater, or about 0.60 OD/mm or greater, or about 0.65 OD/mm or greater, or about 0.60 OD/mm or greater, or any and all absorbance values between the given values. For example, the difference in absorbance between the first portion 34 and the second portion 38 may range from about 0.04 OD/mm to about 0.70 OD/mm, or from about 0.04 OD/mm to about 0.60 OD/mm, or from about 0.04 OD/mm to about 0.50 OD/mm, or from about 0.04 OD/mm to about 0.49 OD/mm, or from about 0.04 OD/mm to about 0.40 OD/mm, or from about 0.04 OD/mm to about 0.30 OD/mm, or from about 0.04 OD/mm to about 0.20 OD/mm, or from about 0.04 OD/mm to about 0.10 OD/mm.

Over a wavelength range of from about 400 nm to about 750 nm, the article 10 may have a difference in absorbance between the first portion 34 and the second portion 38 of about 0.04 OD/mm or greater, or about 0.05 OD/mm or greater, or about 0.10 OD/mm or greater, or about 0.5 OD/mm or greater, or about 1 OD/mm or greater, or about 5 OD/mm or greater, or about 10 OD/mm or greater, or about 15 OD/mm or greater, or about 20 OD/mm or greater, or about 25 OD/mm or greater, or about 30 OD/mm or greater, or about 35 OD/mm or greater, or about 40 OD/mm or greater, or about 45 OD/mm or greater, or about 49 OD/mm or greater, or about 50 OD/mm or greater, or about 55 OD/mm or greater, or about 60 OD/mm or greater, or about 65 OD/mm or greater, or about 60 OD/mm or greater, or any and all absorbance values between the given values. For example, the difference in absorbance between the first portion 34 and second portion 38 may range from about 0.04 OD/mm to about 70 OD/mm, or from about 0.04 OD/mm to about 60 OD/mm, or from about 0.04 OD/mm to about 50 OD/mm, or from about 0.04 OD/mm to about 49 OD/mm, or from about 0.04 OD/mm to about 40 OD/mm, or from about 0.04 OD/mm to about 30 OD/mm, or from about 0.04 OD/mm to about 20 OD/mm, or from about 0.04 OD/mm to about 10 OD/mm.

The article 10 may exhibit a "Contrast Ratio" between the first portion 34 and second portion 38. The Contrast Ratio is defined as the average absorbance of the second portion 38 over a given wavelength range divided by the average absorbance of the first portion 34 over the same wavelength range. Over a wavelength range of from about 400 nm to about 750 nm (e.g., visible light), the Contrast Ratio between the first portion 34 and the second portion 38 may be about 1, or about 1.4, or about 2, or about 5, or about 10, or about 20, or about 30, or about 40, or about 50, or about 60, or about 70, or about 80, or about 90, or about 100, or about 110, or about 120, or about 130, or about 140, or about 150, or about 160, or about 165, or about 170, or about 180, or about 190 or about 200, or any and all values and ranges between the given values. For example, the Contrast Ratio between the first portion 34 and the second portion 38 or a wavelength range of from about 400 nm to about 750 nm may be from about 1.4 to about 200, or from about 1.4 to about 190, or from about 1.4 to about 165, or from about 1.4 to about 120, or from about 1.4 to about 90, or from about 1.4 to about 50, or from about 1.4 to about 20, or from about 1.4 to about 10.

Over a wavelength range of from about 750 nm to about 1500 nm (e.g., visible light), the Contrast Ratio between the first portion 34 and the second portion 38 may be about 1, or about 1.5, or about 2, or about 2.5, or about 3, or about 3.5, or about 4, or about 4.5, or about 5, or about 5.5, or about 6, or about 6.5, or about 7, or about 7.5, or about 8, or about 8.5, or about 9, or about 9.5, or about 10, or about 10.5, or about 11, or about 11.5, or about 12, or about 12.5, or about 13, or about 13.5, or about 14, or about 14.5, or about 15, or about 15.5, or about 16, or about 16.5, or about 17, or about 17.5, or about 18, or about 18.5, or about 19, or about 19.5, or about 20, or about 20.5, or any and all values and ranges between the given values. For example, the Contrast Ratio between the first portion 34 and the second portion 38 over a wavelength range of from about 750 nm to about 1500 nm may be from about 1.5 to about 20, or from about 1.5 to about 18, or from about 1.5 to about 14, or from about 1.5 to about 10, or from about 1.5 to about 8, or from about 1.5 to about 5, or from about 1.5 to about 3.

The article 10 may exhibit differing transmittances over different wavelength bands of electromagnetic radiation. The transmittance may be expressed in a percent transmittance. Transmittance data may be collected using a UV/VIS/NIR spectrophotometer on a sample having a 0.5 mm thickness in conformance with the measurement rules according to ISO 15368. Over a wavelength range of from about 280 nm to about 380 nm, the article 10 may have a transmittance of 0% to about 50%, or from about 0.01 to about 30%, or from about 0.01% to about 0.91%. For example, the article 10 may have a transmittance over a wavelength of from about 280 nm to about 380 nm of about 0.5%, or about 5%, or about 10%, or about 15%, or about 20%, or about 25%, or about 30%, or about 35%, or about 40% or about 45%. It will be understood that any and all values and ranges between the values listed above are contemplated.

The article 10 may have a transmittance over a wavelength range of from about 380 nm to about 400 nm of 0% to about 86%, or from about 0.8% to about 86%, or from about 0% to about 25% or from about 0.02% to about 13%. For example, the article 10 may have a transmittance over a wavelength of from about 380 nm to about 400 nm of about 1%, or about 5%, or about 10%, or about 15%, or about 20%, or about 25%, or about 30%, or about 35%, or about 40%, or about 45%, or about 50%, or about 55%, or about 60%, or about 65%, or about 70%, or about 75% or about 80%. It will be understood that any and all values and ranges between the values listed above are contemplated. Transmittance data may be collected using a UV/VIS/NIR spectrophotometer on a sample having a 0.5 mm thickness in conformance with the measurement rules according to ISO 15368.

The article 10 may have a transmittance over a wavelength range of from about 400 nm to about 700 nm of about 0% to about 95%, or from about 0% to about 88%, or from about 0% to about 82%, or from about 0% to about 70%, or from about 0% to about 60%, or from about 0% to about 50%, or from about 0% to about 40%, or from about 0% to about 30%, or from about 0% to about 20%, or from about 0% to about 10%, or from about 5% to about 50%, or from about 10% to about 70%. It will be understood that any and all values and ranges between the values listed above are contemplated. Transmittance data may be collected using a UV/Vis spectrophotometer on a sample having a 0.5 mm thickness in conformance with the measurement rules according to ISO 15368.

Over a wavelength range of from about 400 nm to about 700 nm, the article 10 may have a transmittance of about 0% to about 90%, or from about 0% to about 80%, or from about 0% to about 70%, or from about 0% to about 60%, or from about 0% to about 50%, or from about 0% to about 40%, or from about 0% to about 30%, or from about 0% to about 20% or from about 0% to about 10%. For example, the article 10 may have a transmittance over a wavelength range from about 400 nm to about 700 nm of about 0%, 5%, 10%, 15%, 20%, 25%, 30%, 35%, 40%, 45%, 50%, 55%, 60%, 65%, 70%, 75%, 80%, 85%, or 90%. It will be understood that any and all values and ranges between the values listed above are contemplated. Transmittance data may be collected using a UV/Vis spectrophotometer on a sample having a 0.5 mm thickness in conformance with the measurement rules according to ISO 15368.

The article 10 may exhibit a scattering of from about 0.1% to about 25%, or from about 0.1% to about 15%, or from about 0.1% to about 10%, all over a wavelength band of about 400 nm to about 700 nm at a thickness of 1 mm. For example, the article 10 may exhibit a scattering of about 25% or less, about 24% or less, about 23% or less, about 22% or less, about 21% or less, about 20% or less, about 19% or less, about 18% or less, about 17% or less, about 16% or less, about 15% or less, about 14% or less, about 13% or less, about 12% or less, about 11% or less, about 10% or less, about 9% or less, about 8% or less, about 7% or less, about 6% or less, about 5% or less, about 4% or less, about 3% or less, about 2% or less or about 1% or less. It will be understood that any and all values and ranges between the scattering values listed above are contemplated. Scattering data is collected in conformance with ISO 13696 (2002) Optics and Optical Instruments—Test methods for radiation scattered by optical components.

According to various examples, the article 10 may exhibit a reflective mirror-like surface. For example, one or more of primary surfaces 18 and 22 may exhibit a reflection greater than typical Fresnel reflections produced by glasses and/or glass-ceramics. In such examples, the article 10 may undergo a reflection treatment to produce a plurality of metallic particles proximate one of the surfaces 18, 22. It will be understood that the reflection treatment may be performed at the same time as the thermal processing (i.e., as described in greater detail below) and/or at a different time (e.g., before and/or after the thermal processing). The article 10, in such examples, may be composed of Ag containing compositions (e.g., Ag+W, Ag+Mo+W, Ag+Au+W, or Ag+Au+Mo+W). During the reflection treatment, the article 10 may be exposed to temperatures of from about 400° C. to about 700° C., or from about 500° C. to about 600° C. For example, the article 10 may be exposed to a temperature of about 400° C., or about 425° C., or about 450° C., or about 475° C., or about 500° C., or about 525° C., or about 550° C., or about 575° C., or about 600° C., or about 625° C., or about 650° C., or about 675° C. or about 700° C. The reflection treatment may be carried out on the article 10 from about 0.5 minutes to about 360 minutes. The reflection treatment may be carried out in a reducing atmosphere such that the metallic precipitates are formed. According to various examples, the atmosphere around the article 10 during the reflection treatment may contain $H_2$. For example, the atmosphere may have a partial pressure of $H_2$ of from about 0.5%, 1.0%, 1.5%, 2.0%, 2.5% or greater. Additionally or alternatively, the article 10 may be exposed to a gas-oxygen flame, where the gas/oxygen ratio is adjusted such that there is not complete combustion (i.e., to form a reducing atmosphere). It will be understood that reflection treatment (e.g., being done in a controlled oxidizing or reducing atmosphere) may be utilized to further alter the bulk or surface composition of the article 10 and in-turn modify the optical absorption of the article 10.

The reflection treatment, under reducing atmospheres, causes $Ag^{1+}$ cations in the article 10 to be reduced to form metallic silver precipitates within the body of the article 10 that are sufficiently large (e.g., >50 nm) to scatter visible wavelengths of light (e.g., about 400 nm to about 700 nm). By controlling the time and temperature of the reflection treatment, Ag metal particles can be controllably precipitated proximate surfaces of the article 10. For example, the plurality of Ag metal particles may be present within the first few microns (e.g., 0.1-20 µm) of the primary surfaces 18, 22. In yet other examples, the metal particles may be distributed throughout the entire thickness of the article 10 (e.g., in examples where the article 10 is sufficiently thin). In examples where only a small fraction of the Ag cations within the first few microns of the surface of the article 10 are reduced to form metal Ag particles, the article 10 can act as a partial or broadband reflector at visible wavelengths. Thus, the reflected color of the article 10 can be changed if it only reflects certain visible wavelengths. If a sufficient quantity of metallic silver particles are formed, the article 10 may be tuned to uniformly reflect all visible wavelengths (i.e., acting as a broadband mirror). As the time at a given temperature of the reflection treatment is increased, the more numerous the Ag metal particles are and the deeper within the article 10 the Ag particles form. If the reflection treatment is conducted for sufficient time and temperature, metallic Ag particles can be precipitated throughout the entire thickness of the article 10, rendering it highly opaque.

It will be understood that other reflection treatments may be performed. For example, partially reflective surfaces can be formed by depositing (e.g., painting, applying, placing) an organic compound such as a slurry of powdered graphite or clay impregnated with an organic (e.g., sugar, corn starch, or graphite) onto the surface of the article 10 and firing it in ambient air. This enables localized reduction of the silver ions in the article 10 by the organic agent. With such treatments, patterns of varying color and reflectivity can be produced.

The article 10 may have a reflectance over a wavelength band of from about 360 nm to about 760 nm prior to the reflection treatment of about 10% or less, or about 9% or less, or about 8% or less, or about 7% or less, about 6% or less, about 5% or less, about 4% or less, about 3% or less, about 2% or less or about 1% or less. Once the reflection treatment is complete, the article 10 may have an average reflectance over a wavelength band of from about 400 nm to about 700 nm of about 1% or greater, about 2% or greater, or about 3% or greater, or about 4% or greater, about 5% or greater, about 6% or greater, about 7% or greater, about 8% or greater, about 9% or greater, about 10% or greater, about 11% or greater, about 12% or greater, about 13% or greater, about 14% or greater, about 15% or greater, about 16% or greater, about 17% or greater, about 18% or greater, about 20% or greater, about 21% or greater, about 22% or greater, about 23% or greater, about 24% or greater or about 25% or greater. Reflected color measurements are collected with an X-Rite colorimeter under D65-10 illumination conditions in reflection mode.

Use of the reflection treatment may produce partially or highly reflective coatings inside of the article 10 before and/or after the formation of the precipitates through the thermal processing. In other words, the article 10 may be made reflective in either the glass or glass-ceramic states. Such a feature may be advantageous in enabling the total extinction of the article 10 to be further modified by varying the concentration of reduced metal particles and the concentration and stoichiometry of the absorptive precipitates. Formation of the metal particles may be advantageous in producing a partially or broadband reflective coating which is resistant to scratching, acids and bases because the reflective metal particles are formed within the first few microns of the surface of the article 10, and not exclusively at the material's surface like many reflective coatings that are deposited by vapor deposition or wet chemical methods.

Figure 2:
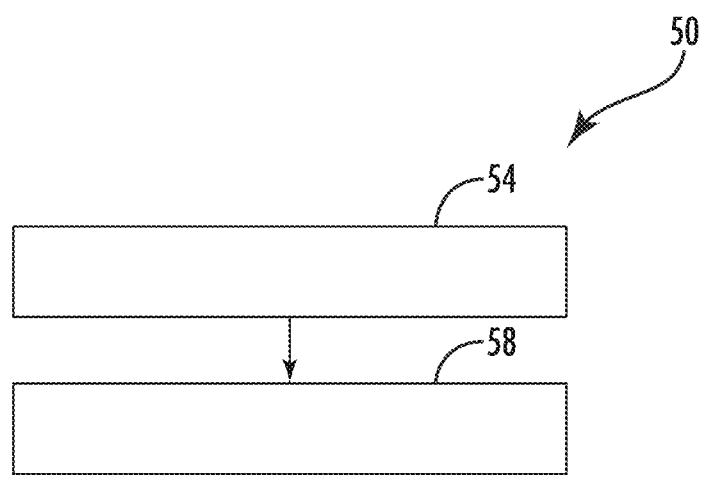
FIG. 2 is a schematic flowchart of a method, according to at least one example.

Referring now to FIG. 2, depicted is a method 50 of forming the article 10. Without being bound by theory, the tungsten and molybdenum glass crystalline precipitates develop the optical absorbance of the article 10 in a fundamentally different mechanism than conventional glasses (i.e., which use tinted and/or dyed interlayers) or glass ceramics. Accordingly, adjusting process steps related to heating and cooling during the thermal processing of the article 10 enables the tuneability of color in addition to the optical density, or tinting, to be readily modulated by making simple alterations to process steps related to cooling.

The method 50 may begin with a step 54 of forming the substrate 14 having a substantially homogenous bulk composition. As explained above, the substrate 14 may being in a glass-state which is free of the crystalline precipitates. The glass substrate 14 includes the first portion 34 and the second portion 38 which may be thermally treated in the same or different manners as explained in greater detail below. The glass-state substrate 14 may have may have any of the above-noted compositions outlined with the article 10. It will be understood that, depending on the composition of the article 10, the substrate 14 may only briefly be in the glass-state and free of the crystalline precipitates just after formation but that such a circumstance not beyond the teachings provided herein.

Next, a step 58 of variably crystallizing at least one of the first portion 34 and the second portion 38 of the substrate 14 to form the plurality of crystalline precipitates within the at least one of the first portion 34 and the second portions 38 is performed. The variable crystallization of the first portion 34 and/or the second portion 38 may be performed in a variety of manners. It will be understood that the times, temperatures, heating rates and cooling rates highlighted above in connection with the thermal processing may be achieved through the examples provided below. Further, although the different examples may highlight one of the first portion 34 and the second portion 38 in its description, it will be understood that use of the other portion does not depart from the teachings provided herein.

In a first example of the variable crystallization, variable crystallization may be performed by thermally processing the first portion 34 and the second portion 38 of the substrate 14 at different temperatures. For example, the first portion 34 may be exposed and/or heated to a temperature which is lower than a temperature the second portion 38 is exposed and/or heated to. The temperature the second portion 38 is exposed to may be sufficiently high to generate the formation of the crystalline precipitates while the temperature the first portion 34 is exposed to may not be sufficiently high to form the precipitates. In practice, such a thermal gradient or difference in temperatures between the first portion 34 and second portion 38 may be achieved in a variety of manners. In some examples, a heat sink may be placed on the first portion 34 of the substrate 14 prior to thermal processing which may function to keep the temperature of the first portion 34 from reaching a temperature in which the crystalline precipitates form as highlighted above. Additionally or alternatively, thermally processing the first portion 34 and the second portion 38 may be performed by selectively heating the first portion 34 or the second portion 38 in a gradient furnace or by localized heating (e.g., through laser, infrared lamp, heat gun, hot item, etc.). In another implementation of the first example, a preheated heat sink may be placed on the second portion 38, but not the first portion 34, such that the second portion 38 is selectively crystallized by thermally processing the first portion 34 and the second portion 38 of the substrate 14 at different temperatures (i.e., with the first portion 34 being at room temperature or another elevated temperature different than the heat sink).

In a second example of the variable crystallization, variably crystallizing the first portion 34 and the second portion 38 may be performed by thermally processing the first portion 34 and the second portion 38 of the substrate 14 at the same temperature and cooling the first portion 34 and the second portion 38 at different cooling rates. Cooling the first portion 34 and the second portion 38 at different rates may be performed in a variety of manners. For example, a heat sink may be placed on the second portion 38 of the substrate 14 during the thermal processing such that the heat sink is the same temperature as the second portion 38. Once removed from the heat, the first portion 34 without the heat sink will tend to cool faster (i.e., drop below the crystallization temperature quicker thereby growing fewer and/or smaller crystalline precipitates) while the second portion 38 with the heat sink will cool slower due to the added thermal mass of the heat sink (i.e., growing more and/or larger crystalline precipitates and/or crystalline precipitates of different chemistries or structures). Additionally or alternatively, one or more of the first portion 34 and the second portion 38 may be covered with an infrared shield. The infrared shield may be a film, coating, foil, or other structure that may be removably placed on or above one or more of the first portion 34 and the second portion 38 of the substrate 14. The infrared shield may be composed of a metal (e.g., aluminum, iron, etc.) or other material configured to reflect infrared wavelength ranges of light emitted from the substrate 14. Use of such an infrared shield may be advantageous in reflecting infrared light emitted from the substrate 14 back into the substrate 14 such that the cooling rate of one or more of the first portion 34 and the second portion 38 may be slowed (i.e., due to the reabsorption of the infrared radiation). It will be understood that different infrared shields with different reflection/absorption characteristics may be used on the first portion 34 and the second portion 38 such that both portions (first portion 34 and second portion 38) include an infrared shield, but that the cooling rates of the first portion 34 and the second portion 38 may still be different. Through the addition of the infrared shield and/or the heat sink and the depression of the cooling rate, the time the substrate 14 spends at an elevated temperature is increased such that the more crystallization occurs (i.e., having a greater effect on optical properties). For example, the first portion 34 and the second portion 38 of the substrate 14 may be subjected to a temperature greater than about 400° C. for different times due to the use of the heat sink and/or the infrared shield. It will be understood that the heat sink and/or infrared shield may be utilized in gradient temperature furnaces or other circumstances where non-uniform heating of the first portion 34 and the second portion 38 occurs such that the substrate 14 need not be thermally processed at the same temperature in order to allow cooling the first portion 34 and the second portion 38 at different cooling rates.

In a third example, variably crystallizing the first portion 34 and the second portion 38 may include increasing the temperature of the first portion 34 and the second portion 38 at different heating rates. For example, a heat sink may be placed on the first portion 34 at ambient temperature prior to the substrate 14 being placed within a furnace or other heating source. As the furnace heats to the crystallization temperature, the added thermal mass of the heat sink slows the heating rate of the first portion 34 of the substrate 14. As such, the first portion 34 may be heated at a slower rate than the second portion 38. As the first portion 34 with the heat sink is heated at a slower rate than the second portion 38 which is free of the heat sink, the time the first portion 34 spends at the crystallization temperature may be less than the second portion 38 leading to selective crystallization of the second portion 38 and increased optical density.

In a fourth example, the second portion 38 of the substrate 14 may have a preheated heat sink applied thereto in order to variably crystallize the substrate 14. The substrate 14 may be at room temperature or may be at an elevated temperature. The heat sink may be at a temperature above the crystallization temperature of the substrate 14 such that the area of the second portion 38 in contact with the preheated heat sink is selectively crystallized and changes in optical properties relative to the first portion 34 such that the substrate 14 is variably crystallized.

It will be understood that, although explained concisely for clarity, a variety of manners exist to accomplish the first, second, third and fourth examples of variable crystallization and that such manners may be used without departing from the teachings provided herein. For example, varied cooling or heating across the substrate 14 can be induced through the use of air jets or burners, or molds that have an induced thermal gradient.

By making use of the above-noted examples, the first portion 34 and second portion 38 may be variably crystallized by thermally processing the first portion 34 and the second portion 38 of the substrate 14 at one or more of (a) different temperatures (i.e., examples one and three), (b) different heating rates (i.e., example three) and (c) different thermal hold times (i.e., examples two and three). As highlighted above, crystallization of the substrate 14 may result in a change of the optical properties of the substrate 14 and therefore variable crystallization of the substrate 14 may result in the selective formation of these optical properties. For example, the variable crystallizing of the at least one of the first portion 34 and the second portion 38 may result in at least one of: (a) a difference in absorbance between the first portion 34 and the second portion 38 of about 0.03 OD/mm to about 49 OD/mm over a wavelength range of from about 400 nm to about 750 nm, and (b) a difference in absorbance between the first portion 34 and the second portion 38 of about 0.03 OD/mm to about 0.69 OD/mm over a wavelength range of from about 750 nm to about 1500 nm. Further, the variable crystallization may generate a plurality of crystalline precipitates in at least one of the first portion 34 and the second portion 38 of the substrate 14 such that (i) a difference in absorbance exists between the first portion 34 and the second portion 38 of about 0.04 OD/mm to about 49 OD/mm over a wavelength range of from about 400 nm to about 750 nm and (ii) a Contrast Ratio between the first portion 34 and the second portion 38 is from about 1.4 to about 165 over a wavelength range of from about 400 nm to about 750 nm.

Various examples of the present disclosure may offer a variety of properties and advantages. It will be understood that although certain properties and advantages may be disclosed in connection with certain compositions, various properties and advantages disclosed may equally be applicable to other compositions.

First, use of the present disclosure allows for a simple low-cost method of patterning the substrate 14 and portions designated to be crystallized (e.g., first portion 34 and second portion 38) only need to be masked with foil, metal, or insulation. Further, the disclosed method 50 works both in passive and active modes since the first portion 34 and/or the second portion 38 can either be insulated or heated to pattern. Local heat sources like burners, torches, lasers, heat lamps, or hot filaments can be used to pattern.

Second, gradient tint and color, clear apertures, patterning for decoration, and text can be produced within substrate 14 without the need for ultraviolet exposure through a mask as required by conventional photo-sensitive glasses. Such a feature may be advantageous in enabling a low-cost and aesthetically pleasing substrate 14. Further, for automotive related examples, gradient tint may be developed in the substrate 14 which could replace expensive graded polyvinyl butyral interlayers and also ink/frit boarders.

Third, the compositions of the article 10 and substrate 14 allow the production of glazing for automotive and architecture, housings for consumer electronic devices, and ophthalmic lenses with gradient tint, gradient color, patterning, and or indicia (e.g., text, pictures etc.) that has been 'developed' within the material (i.e., not applied by etching, deposition of a pigment, or otherwise).

In automotive examples, the article 10 may aid in the elimination of ink/frit applied to the edges of laminated glazing panels to provide ultraviolet protection of the sealants used in the lamination process and conceal the glue seam from view. With the disclosed method 50 of making the article 10, gradient tinting and edge shading can be achieved, which could serve as an ultraviolet-blocker and also for aesthetic purposes. In ophthalmic lens examples, gradient tint and color can be achieved without using conventional films which may be expensive to apply and subject to scratching.

Fourth, as the compositions of the article 10 disclosed herein differ from the known copper-, silver-, and gold-doped glasses, the color of the articles 10 can be widely tuned without changing composition and successfully meet optical specifications over a number of distinct colors. As such, the family of compositions disclosed herein for the article 10 may offer a practical solution to streamlining colored article production. As explained above, a wide range of optical absorbance may be achieved by varying heat treatment time and temperature after forming. As such, a single tank of glass may be used to continuously produce articles 10 that can be heat treated to multiple specific colors as customer demand dictates (i.e., reducing production downtime, decreasing unusable transition glass). Further, various compositions of the article 10 are also capable of producing a near complete rainbow of colors by varying heat treatment time and temperature across the article 10 (e.g., a rainbow of colors can be produced within a single article). In addition to changes in color, a perceived tint, or transmittance, may be varied across the article 10. As the tint of the article 10 itself may be adjusted, dyed plastic laminates, films, or dyed polycarbonate lenses of conventional articles may be eliminated. Further, as the colors, reflectance and/or tints achieved by the article 10 are a property of the article 10 itself, the article 10 may exhibit greater environmental durability (e.g., abrasion and/or chemical resistance) than conventional polymer articles. In specific applications, the article 10 may be utilized as sunglass lenses (i.e., which may be advantageous as the article 10 may offer a wide variety of colors in addition to absorbing infrared radiation to protect sunglass wearers from heat and the radiation) and/or in automotive or architecture applications (e.g., where gradient fades or multiple colors are desired in the same window pane providing designers a new level of flexibility with respect to multiple colors, transmission, and saturation in a monolithic article 10 all while blocking deleterious ultraviolet and/or infrared radiation thereby decreasing the heating and cooling loads on the cars or buildings they adorn). For example, the article 10 may meet the standards ISO 14 889:2013 & 8980-3 2013, ANSI Z80.3-2001, AS 1067-2003 and ISO 12312-1:2013.

Fifth, as the articles 10 may exhibit tunable optical properties (e.g., color, transmittance, etc.) with varying thermal processing, treatment in a gradient furnace or under infrared lamp can produce nearly a complete rainbow of colors within a single piece of material (e.g., which may be desirable for aesthetic purposes such as cell phone or tablet backs). Further, as the thermal processing may be localized (e.g., through use of a laser), the article 10 may be patternable and colorable. For example, a laser-assisted heating and/or cooling process may utilize different wavelengths to produce novel decorative materials and rapidly produce logos and images within the article 10. By optimizing laser power and writing speed, a host of colors can be achieved.

Further, laser patterning with multiple wavelengths may be employed to selectively bleach (i.e., remove color and/or tint in selected areas through the dissolution and of the chemical alteration of the precipitates) which may be useful for decoration, gradient absorption, or other unique artistic effects.

EXAMPLES

The following examples represent certain non-limiting examples of the glass-ceramic materials and articles of the disclosure, including the methods of making them.

Figure 3A:
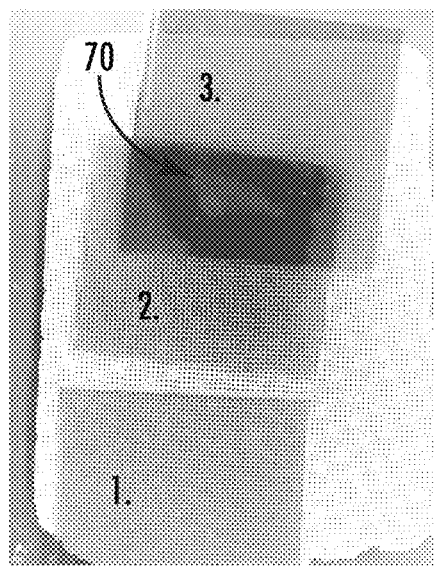
FIGS. 3A and 3B are images taken of a plurality of wafers after heat treating followed by a controlled cooling.
Figure 3B:
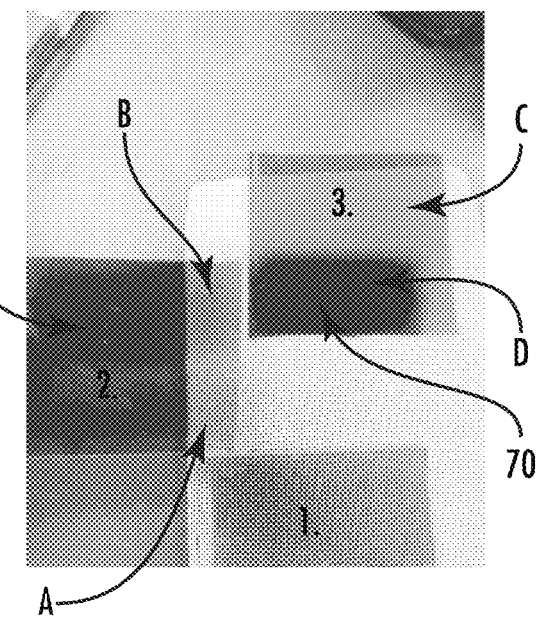
Figure 3C:
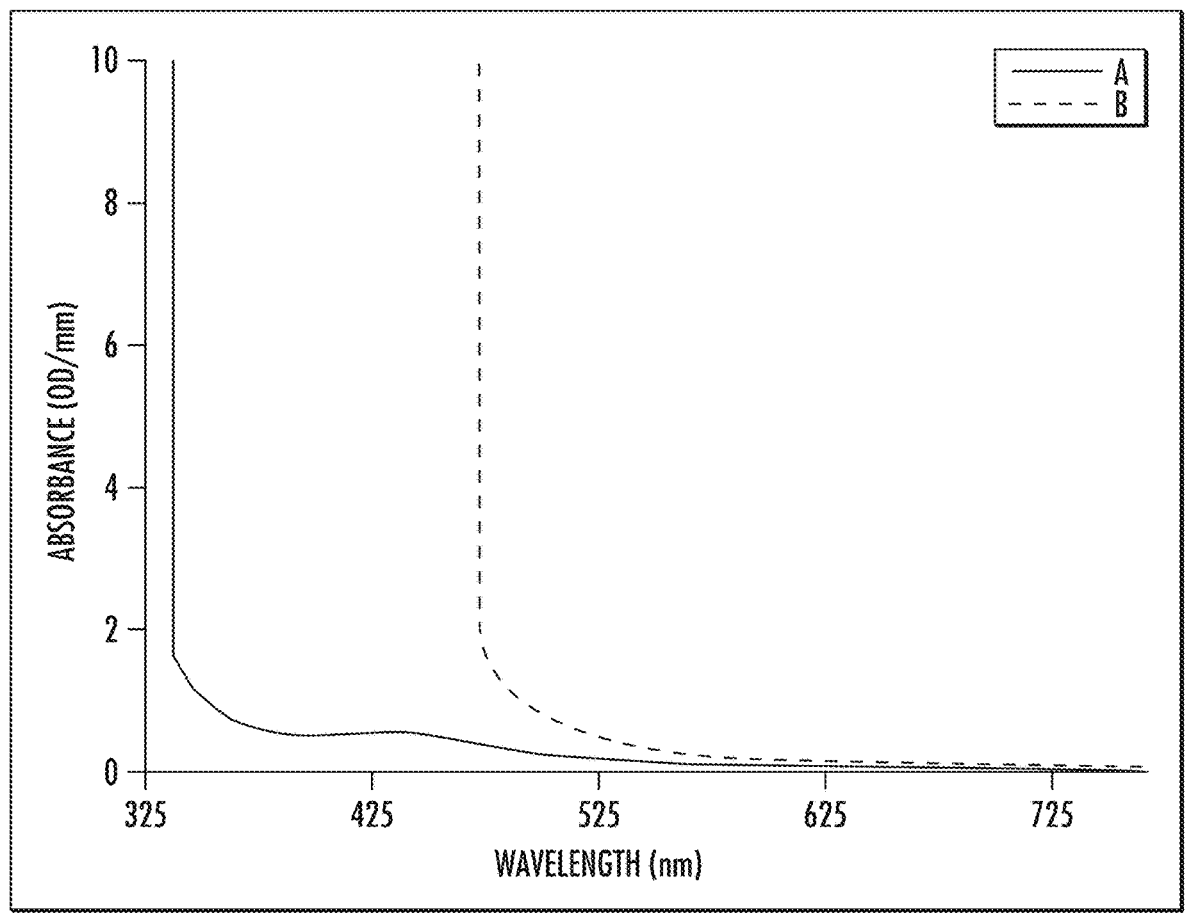
FIG. 3C is a plot of absorbance vs wavelength for sample 2 of FIGS. 3A and 3B.

Referring now to FIGS. 3A and 3B, provided are images of three pieces of glass-ceramic wafer (e.g., the substrate 14) denoted as samples 1, 2 and 3. Samples 1, 2 and 3 had the composition outlined in Table 6.

TABLE 6

| Constituent | Mol (%) |
|---|---|
| $SiO_2$ | 55.4061 |
| $Al_2O_3$ | 10.8486 |
| $B_2O_3$ | 12.6679 |
| $Li_2O$ | 5.4285 |
| $Na_2O$ | 6.6304 |
| $K_2O$ | 0.0230 |
| MgO | 0.0148 |
| CaO | 0.1906 |
| $SnO_2$ | 0.1428 |
| $WO_3$ | 3.0956 |
| Ag | 0.1160 |
| $Fe_2O_3$ | 0.0023 |
| Cl— | 0.0008 |
| $TiO_2$ | 0.0040 |
| F— | 5.4287 |
| Total | 100 |

Samples 1, 2 and 3 were placed on a piece of cellular ceramic such that sample 1 did not contact samples 2 and 3, and such that sample 2 partially covered sample 3. Samples 1-3 were then plunged (e.g., step 58) into an ambient air electric oven pre-heated to 550° C. and held for approximately forty minutes. Samples 1, 2 and 3 were removed from the oven on the piece of cellular ceramic and allowed to cool in ambient air. Only where sample 2 overlapped with sample 3 did a tinted area 70 having a strong red coloration develop. The experiment demonstrates that by altering the cooling rate of the samples (e.g., by using sample 2 as a thermal blanket over a portion of sample 3), that a significant change in optical absorbance can be observed. Without being bound by theory, it is believed that the tinted area 70 is the result of the higher thermal mass of overlapped samples 2 and 3 cooling slower and resulting in a greater volume and average size of crystalline precipitate.

Figure 3D:
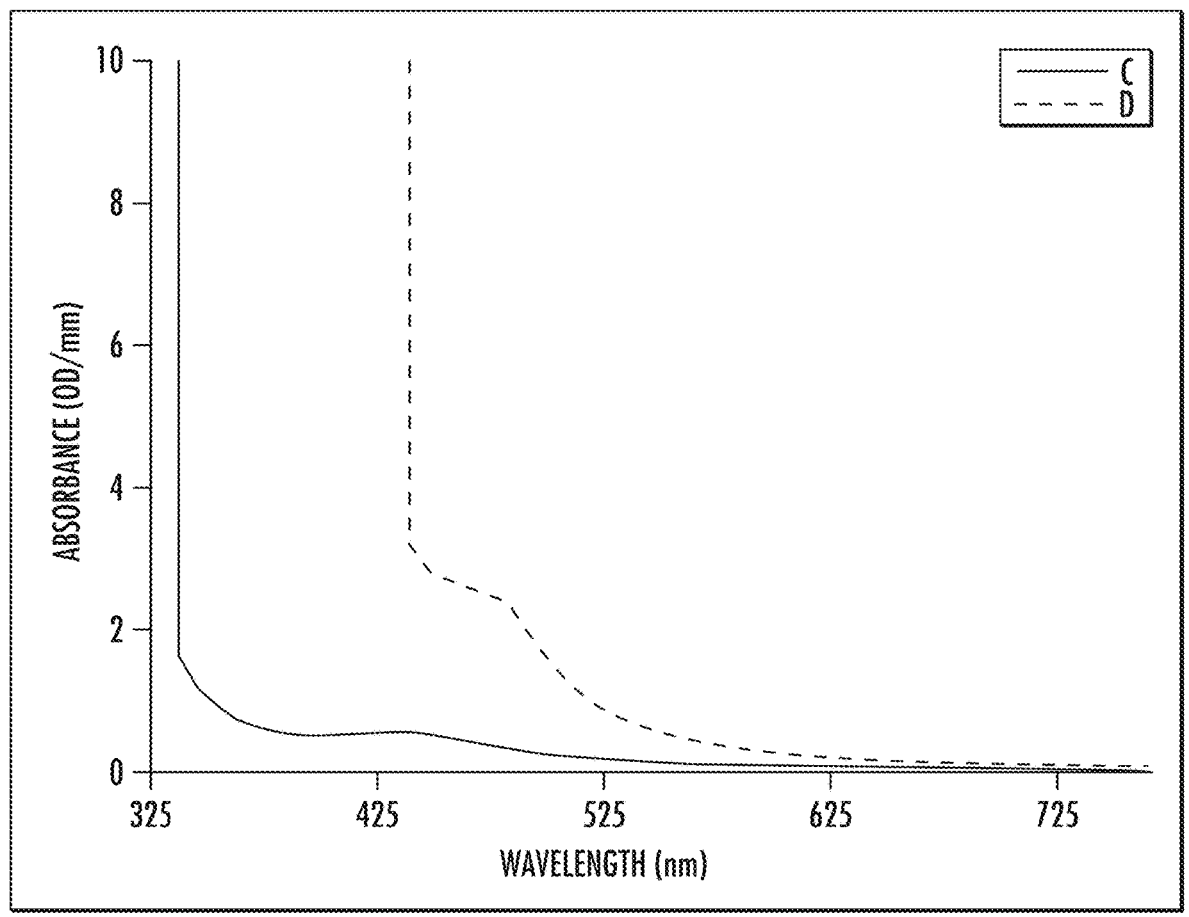
FIG. 3D is a plot of absorbance vs wavelength for sample 3 of FIGS. 3A and 3B.

Referring now to FIGS. 3A-3D, provided are absorbance spectra in OD/mm of sample 2 (FIG. 3C) and sample 3 (FIG. 3D). Regions "A" and "C" (e.g., the first portion 34) were sections of samples 2 and 3 which were not contacting each other. Regions "B" and "D" (e.g., the second portion 38) were in direct contact with each other and form the tinted area 70 of each of sample 2 and sample 3.

Figure 4A:
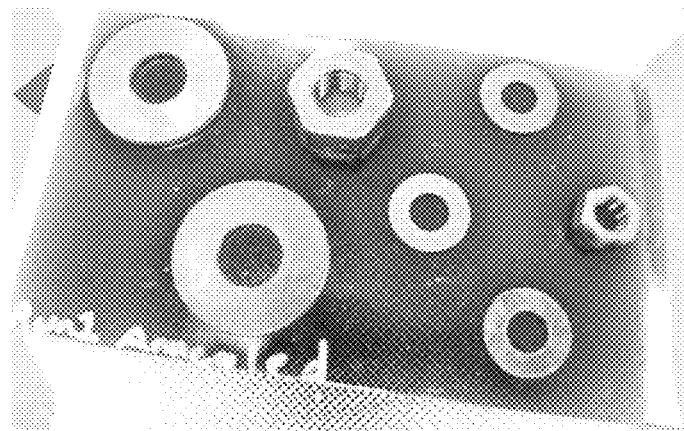
FIG. 4A is an image of a wafer cooling in air after a heat treating.
Figure 4B:
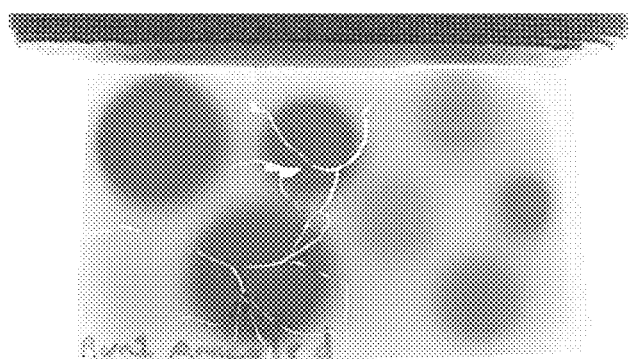
FIG. 4B is an image of the wafer of FIG. 4A placed on a light table to highlight the contrast difference across the wafer.

Referring now to FIGS. 4A and 4B, provided are images of a glass-ceramic wafer made of the composition outlined in Table 6. In FIG. 4A, the wafer is cooling in air on a lab bench after thermal treatment at 550° C. in an ambient air electric oven for approximately 60 minutes with various stainless steel washers and nuts (e.g., heat sinks) placed atop it. The wafer was then allowed to cool in ambient air. Note that as the wafer cools, the regions around the washers and nuts is initially lighter because the washers and bolts are holding the heat longer above the temperature where the color generating crystallites form. As the wafer cools further, the regions around and beneath the washers and nuts appears darker. In FIG. 4B, the fully cooled, room temperature wafer is placed on a light table to highlight the difference in optical density.

Figure 4C:
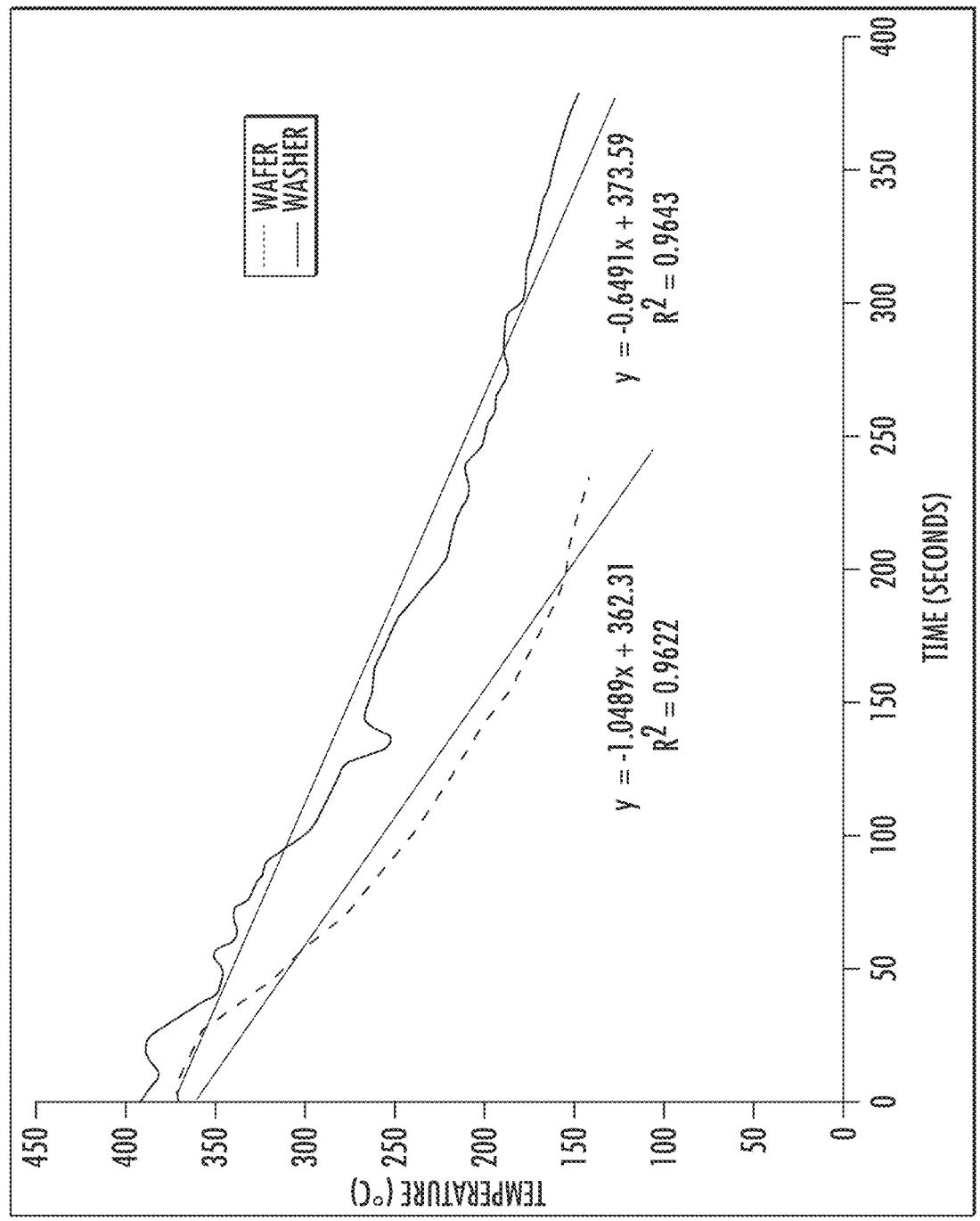
FIG. 4C is a plot of the temperature of a wafer and a metal washer vs. time after a heat treating for a sample consistent with FIG. 4A.

Referring now to FIG. 4C, provided is a plot of temperature vs time to illustrate the cooling rate of the wafer of FIG. 4A incorporating a washer. The plot of FIG. 4C was formed using the same composition as Table 6 and thermal treatment (550° C. for 1 hour and then cooling in ambient air) as FIG. 4A. During cooling, thermocouples were affixed to measure the temperature of the wafer not contacting a metal washer (i.e., denoted "wafer" on FIG. 4C) and the wafer contacting the washer (i.e., denoted "washer" on FIG. 4C). As self-evident from the data, the portion of the wafer contacting the metal washer cooled more slowly. The wafer itself cooled at a rate of about 1.04 degrees C. per second and the wafer contacting the metal washer cooled at 0.649 degrees C. per second (i.e., about 1.6× slower). Such a lower cooling rate associated with the presence of the metal washer is believed to have increased the size and quantity of the crystallites which in turn generated the optical pattern observed in FIG. 4B.

Figure 5A:
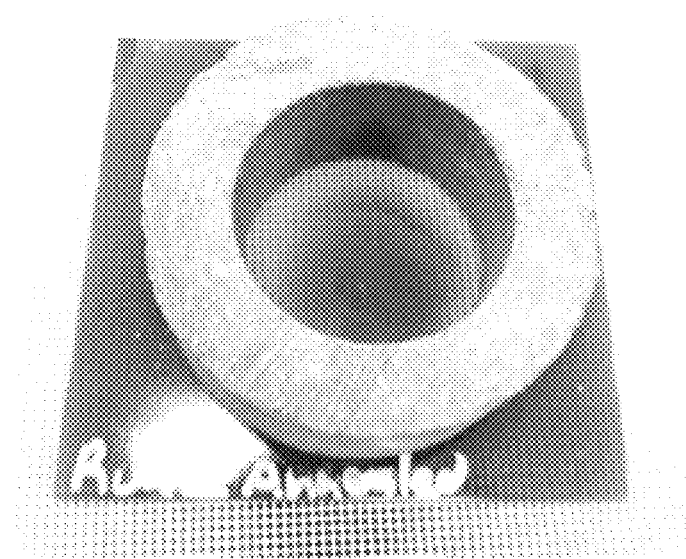
FIG. 5A is an image of a wafer with a graphite part cooling after heat treatment.
Figure 5B:
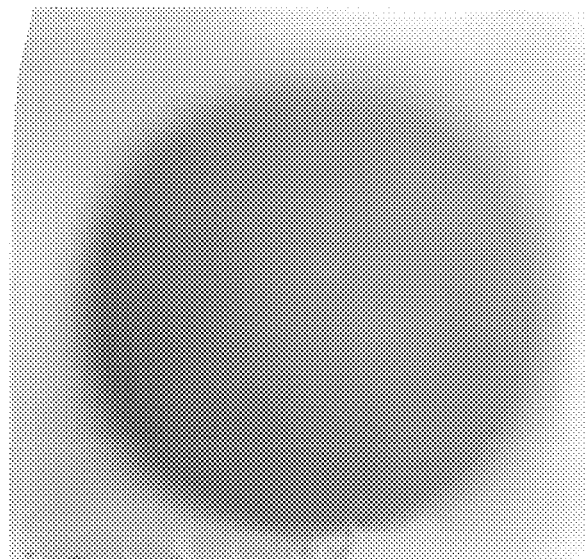
FIG. 5B is an image of the wafer of FIG. 5A positioned on a light table with the graphite part removed.

Referring now to FIGS. 5A and 5B, provided are images of a wafer made of the composition of Table 6. FIG. 5A is an image of the wafer cooling in air on the lab bench after thermal treatment at 550° C. in an ambient air electric oven for approximately 60 minutes with a cylindrically shaped graphite part placed atop the wafer prior to thermal treatment. Similarly to what was observed in FIG. 4A, the region around the graphite heat initially remains transparent (FIG. 5A) because the graphite acts as a heat sink, allowing the glass to remain above the temperature of color generation. Again, as the part cools, the region below the graphite part darkens (FIG. 5B). Note that despite it being a hollow/ring-shaped form, the resultant coloration does not reflect the actual shape of the part. Without being bound by theory, it is believed that the resultant shape is a due to the large thermal mass of the part and by the diffusion of the heat from the graphite part.

Figure 6A:
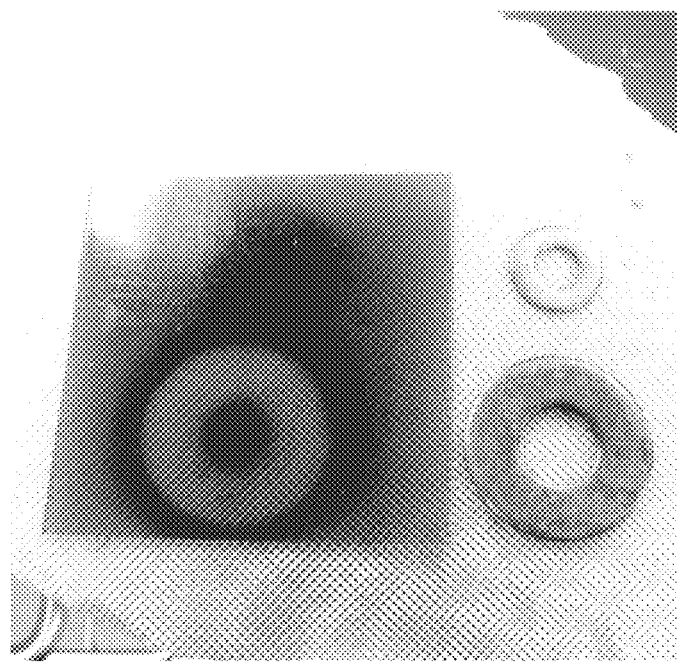
FIG. 6A is an image of a wafer with a plurality of metal washers cooling after heat treatment.
Figure 6B:
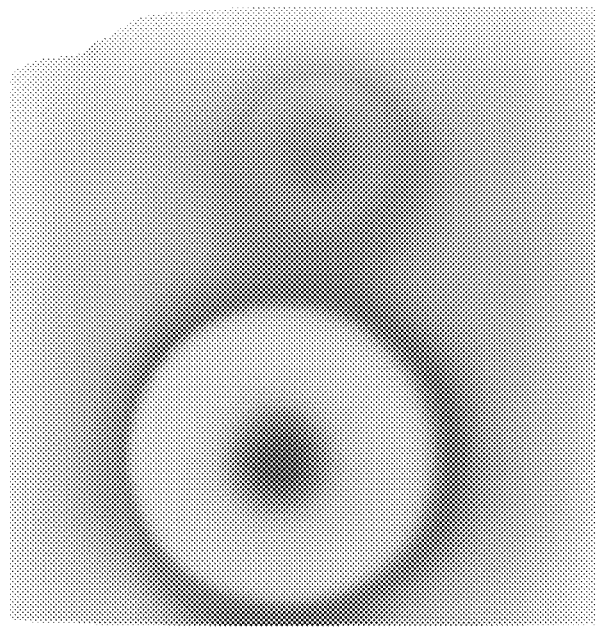
FIG. 6B is an image of the wafer of FIG. 6A positioned on a light table with the metal washers removed.

Referring now to FIGS. 6A and 6B, provided are images of a wafer made of the composition of Table 6. FIG. 6A is an image of the wafer cooling in air on the lab bench after thermal treatment at 550° C. in an ambient air electric oven for approximately 60 minutes with two stainless steel washers placed atop the wafer prior to thermal treatment. Upon cooling in ambient air analogous behavior to what was observed in FIGS. 4B and 5B, however by removing the washers after a few seconds after the wafer was removed from the oven, the resulting darkening pattern had greater resolution.

Figure 7A:
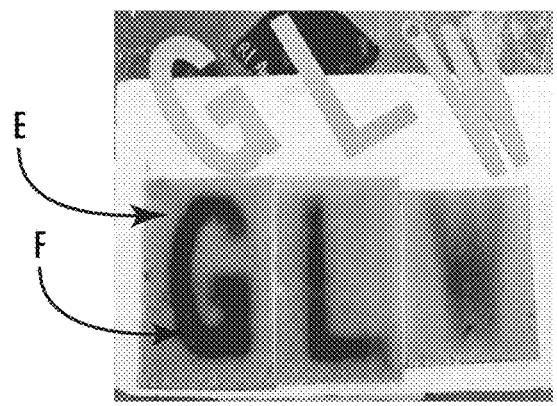
FIG. 7A is an image of a plurality of wafers positioned on a light table with their associated metallized letters used in a heat treatment.

Referring now to FIG. 7A, provided is an image of three wafers made of the composition of Table 6. Thin (i.e., about 0.5 mm) galvanized metal letters (e.g., the heat sink and/or the infrared shield) were placed atop the three wafers before heat treatment, followed by approximately 1.5 hours at 550° C. in an ambient air electric oven, and then cooling in ambient air. The resolution was improved due to the reduced thickness of the metal heat sink, which reduced thermal diffusion.

Figure 7B:
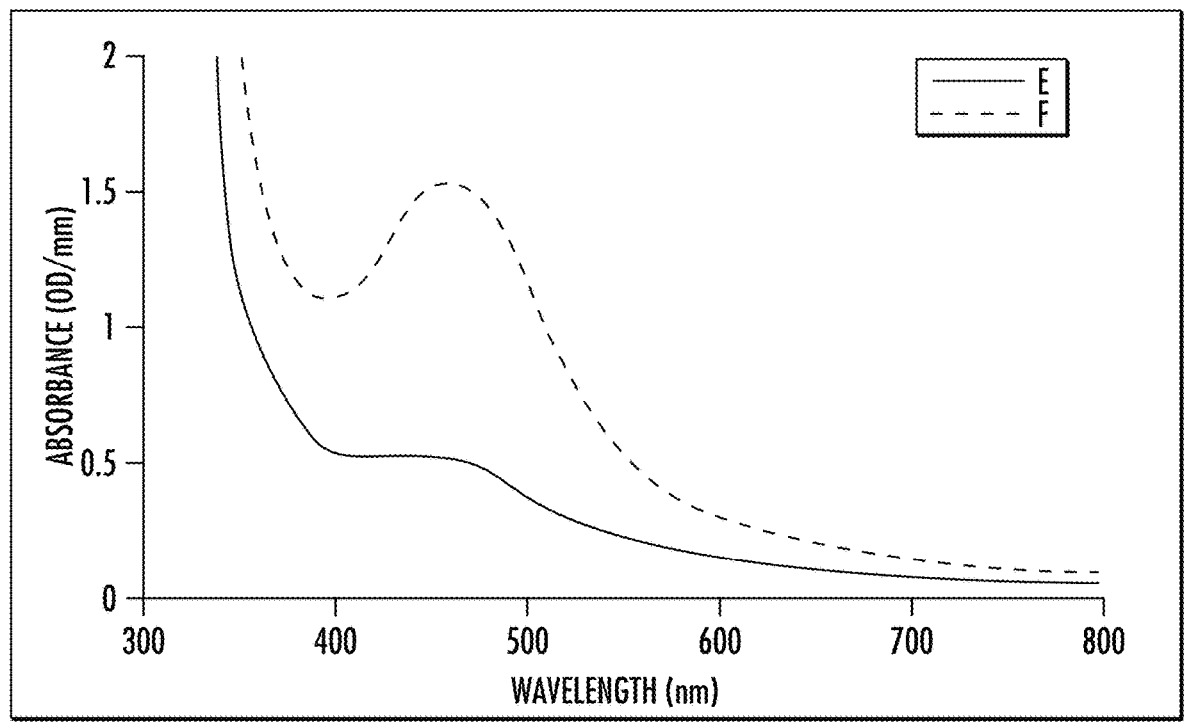
FIG. 7B is a plot of absorbance vs wavelength for regions E and F of FIG. 7A.

Referring now to FIGS. 7A and 7B, provided in a plot of the absorbance spectrum in OD/mm between a region that was not in contact with the metal letter G, denoted by "E"

(e.g., the first portion 34), and a second region that was beneath the metal letter G denoted by "F" (e.g., the second portion 38).

Figure 8A:
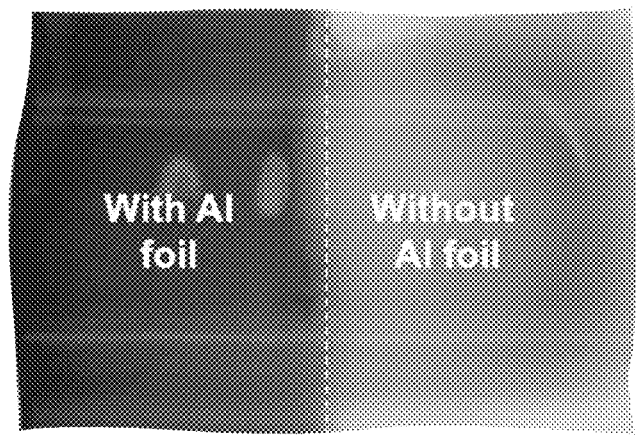
FIGS. 8A and 8B are images of wafers on light tables on which strips of aluminum foil were placed during heat treating.
Figure 8B:
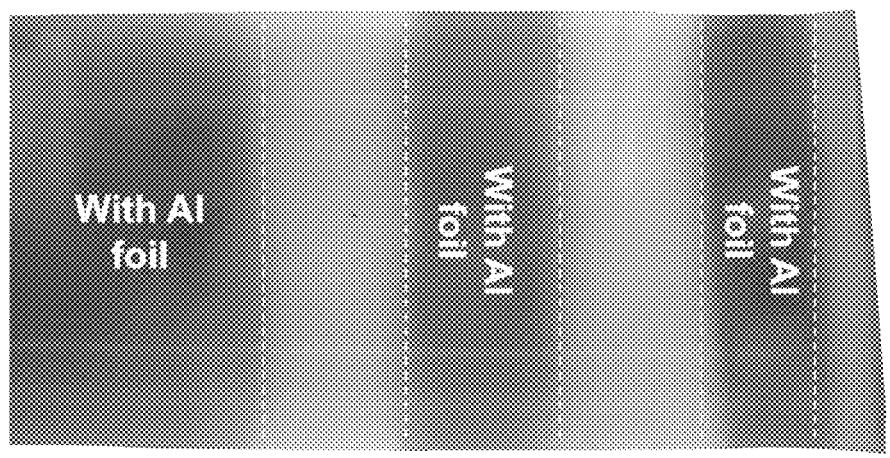

Referring now to FIGS. 8A and 8B, provided are images of wafers made of the composition of Table 6. Aluminum foil layers (e.g., the infrared shield) have a similar effect as what was shown in FIG. 7A. The depicted examples, the wafers were wrapped in Reynolds® aluminum foil and heat treated at 550° C. for about 60 minutes and cooled in ambient air (FIG. 8A). FIG. 8B shows the result of aluminum foil strips of varying thickness being wrapped around a wafer with the same composition and thermal treatment. In both parts, regions covered with the aluminum foil (e.g., the second portion 38) were significantly darker than the uncovered regions (e.g., the first portion 34). Without being bound by theory, it is believed that owing to the low thermal mass of aluminum foil, the change in optical absorbance is a result of the aluminum foil functioned as an infrared reflector that slows the cooling rate of the wafer which is emitting in the infrared as it cools.

Figure 9A:
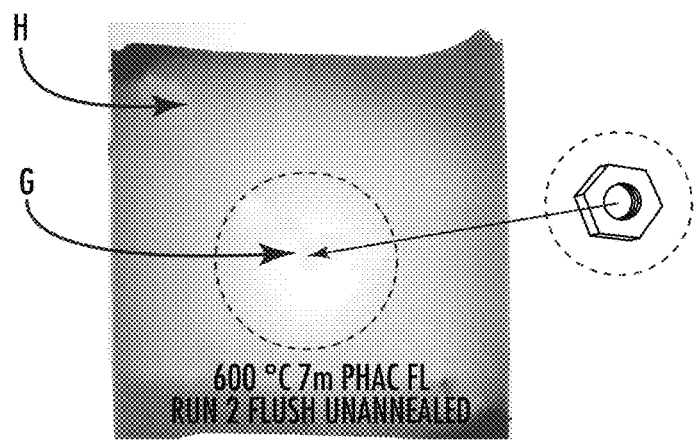
FIG. 9A is an image of a wafer on which a metal nut was placed during heat treatment.

Referring now to FIG. 9A, provided is an image of a wafer made of the composition of Table 6. The use of a metal nut (e.g., a heat sink) can also act to retard or completely prevent coloration of the wafer within the region it contacts by preventing that local area from reaching the crystallization temperature. For example, by placing a metal nut onto the wafer and heat treating the wafer for a shorter amount of time (1-30 minutes) followed by rapid cooling, the metal nut may prevent the wafer from reaching the crystallization temperature. As the metal nut heats slower than the wafer on which it is positioned, the region beneath the metal nut remains cooler than the rest of the material which slows the formation of color generating crystals in that region. The wafer of FIG. 9A was heat treated for 7 minutes at 600° C., and cooled in ambient air. The approximate region where the metal nut was placed remained largely transparent.

Figure 9B:
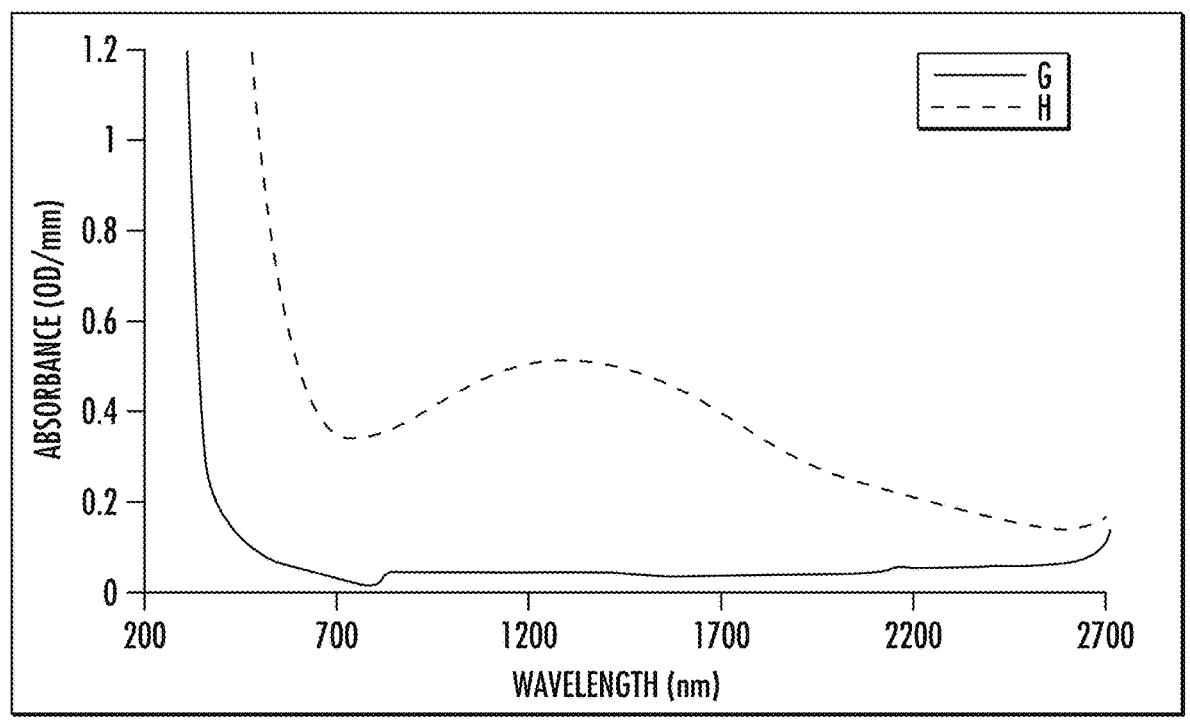
FIG. 9B is a plot of absorbance vs wavelength for the wafer of FIG. 9A.

Referring now to FIGS. 9A and 9B, provided is an absorbance spectra in OD/mm of the light-colored region that was directly contacting the metal nut, denoted as "G", and the darker colored region of the sample that was not contacting the metal nut, denoted as "H".

Figure 10A:
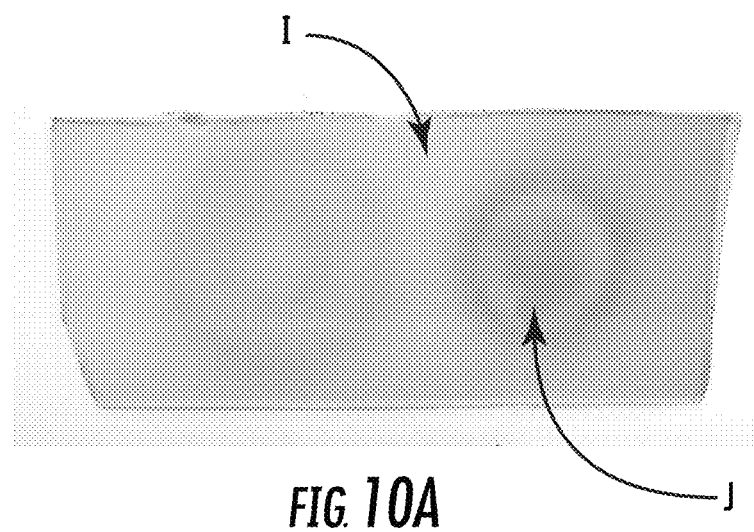
FIG. 10A is an image of a wafer on which a preheated metal washer was placed.

Referring now to FIG. 10A, provided in FIG. 10A in an image of a wafer having the composition provided in Table 6. The wafer was treated in the following manner: (1) two stainless steel washers were pre-heated to 700° C. in an ambient air electric oven; (2) simultaneously, a piece unannealed wafer was placed into an ambient air electric furnace holding at 550° C. for 5 minutes; (3) the 700° C. washers were transferred onto the pre-heated wafer and held at 550° C. for 5 min; (4) the wafer was then removed from the oven, the washers were taken off the surface, and then the wafer was heated for another 5 minutes at 550 C; and (6) upon cooling in air, an image of where the washers were placed appeared within the wafer. Such a thermal treatment indicates that if the temperature of a heat sink placed on a wafer is at or above the crystallization temperature and locally raises the temperature of a region of the wafer it is placed upon, it can also be used to selectively crystallize a particular region (i.e., like a branding iron).

Figure 10B:
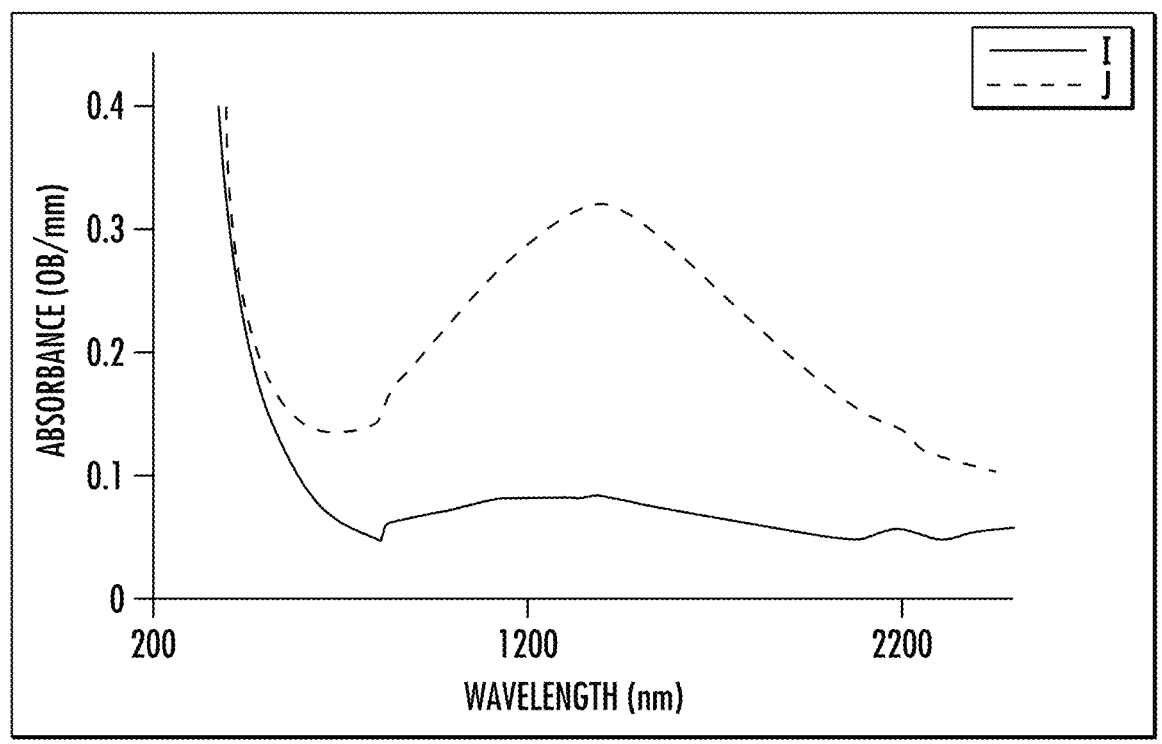
FIG. 10B is a plot of absorbance vs wavelength for the wafer of FIG. 10A.

Referring now to FIGS. 10A and 10B, provided is an absorbance spectra in OD/mm of the light-colored region that was not contacting the metal washer, denoted as "I", and the darker colored region of the sample that was contacting the metal washer, denoted as "J".

Figure 11A:
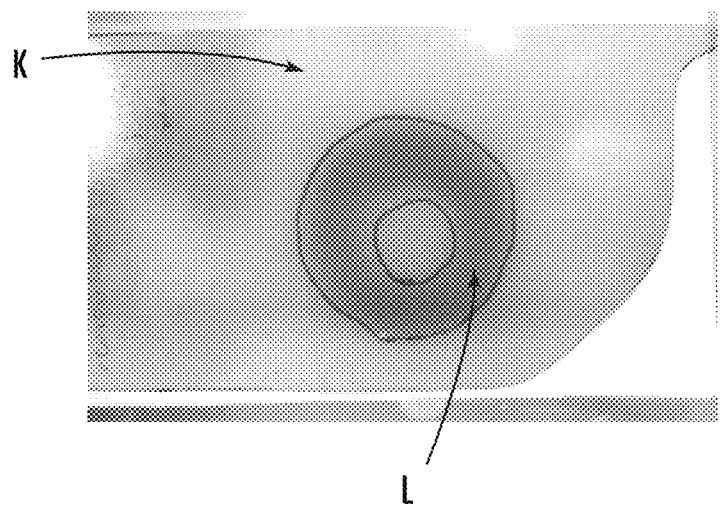
FIG. 11A is an image of a wafer on which a preheated washer was placed.

Referring now to FIG. 11A, similarly to FIG. 10A, provided is an additional example of the technique described in connection with FIG. 10A. Pictured is a wafer having the composition of FIG. 10A that was treated in the following manner: (1) the wafer was placed in an ambient air electric furnace for 10 minutes that was pre-heated to 550° C.; (2) simultaneously, a stainless steel washer was pre-heated to 700° C. in a second an ambient air electric furnace; (3) the pre-heated washer was removed from the furnace and placed atop the wafer and further heated at 550° C. for an additional 10 minutes; (4) the wafer with the washer atop it was removed from the oven; and (5) the washer was then immediately removed from the surface, and the wafer was allowed to cool in ambient air. The region of the wafer where the washer was in contact was red in color, versus that which was not in contact was an amber brown color.

Figure 11B:
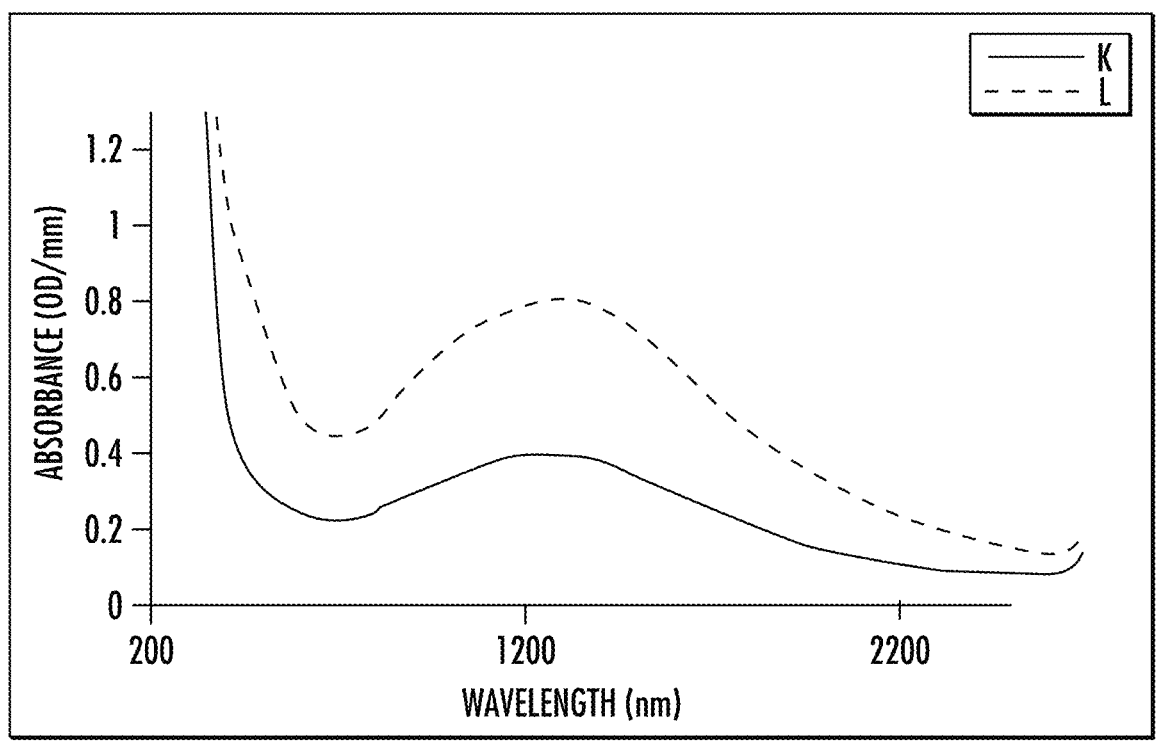
FIG. 11B is a plot of absorbance vs wavelength for the wafer of FIG. 11A.

Referring now to FIGS. 11A and 11B, provided is an absorbance spectrum in OD/mm of an amber brown-colored region that was not contacting the steel washer denoted by "K" and a red-colored region that was directly beneath the metal washer, denoted by region "L".

Referring now to Table 7, provided are a variety of optical properties of the Examples provided in the plots of FIGS. 3C, 3D, 7B, 9B, 10B and 11B.

TABLE 7

| FIG. | Region | Average Visible Absorbance (OD/mm from 400-750 nm) | Average Near-Infrared Absorbance (OD/mm from 750-1500 nm) |
|---|---|---|---|
| 3C | A | 0.30 | 0.04 |
| 3C | B | 49.38 | 0.08 |
| 3D | C | 0.30 | 0.04 |
| 3D | D | 17.66 | 0.09 |
| 7B | E | 0.24 | 0.05 |
| 7B | F | 0.63 | 0.09 |
| 9B | G | 0.07 | 0.03 |
| 9B | H | 0.77 | 0.45 |
| 10B | I | 0.13 | 0.07 |
| 10B | J | 0.18 | 0.25 |
| 11B | K | 0.29 | 0.35 |
| 11B | L | 0.63 | 0.69 |

Table 8 provides the Contrast Ratio of the average visible (400-750 nm) and near-infrared (750-1500 nm) absorbance in OD/mm of Region 2/Region 1 (e.g., the second portion 38 divided by the first portion 34). The value of the Contrast Ratio conveys the change in absorbance manifested from the selective crystallization.

TABLE 8

| FIG. | Visible Contrast Ratio (OD/mm from 400-750 nm) | Near-Infrared Contrast Ratio (OD/mm from 750-1500 nm) |
|---|---|---|
| 3C | 162.55 | 1.84 |
| 3D | 58.44 | 2.05 |
| 7B | 2.61 | 1.94 |
| 9B | 11.16 | 13.20 |
| 10B | 1.41 | 3.42 |
| 11B | 2.15 | 2.00 |

Referring now to FIGS. 12A-14B, provided are additional examples of glass-ceramic wafers made of the composition outlined in Table 6. The glass-ceramic wafers were subject to thermal processing to provide a plurality of portions with different optical properties (e.g., transmittance, color, optical density, etc.), thereby providing a gradient tint in the wafer. In these embodiments, a hybrid thermal heat sink comprising an IR-reflective coating and an insulating core of varying shape was used to alter the local temperature of the wafers, which altered the optical absorbance of the wafers. The heat sinks were placed in direct contact or proximity to the glass ceramic wafer at room temperature and then the entire assemblage was heat treated together, as also discussed above with regard to other embodiments. The portions of the glass that were in direct contact or proximity to the heat sink remained cooler than the exposed portions and, thus, resulted in a different optical absorbance. Varying the shape and size of the heat sink enables control over how much of a temperature delta exists between the region affected by the heat sink. Further the heat sink shape can be used to create unique patterns or gradients in color with a conventional isothermal annealer or 'lehr'.

Without being bound by theory, the superior performance of these hybrid heat sinks is attributed to the combined use of a broadband infrared (IR) reflector that rejects heat and an insulator, which has low thermal conductivity. This combination of reflection and poor heat transfer enables the area of the glass ceramic affected by this hybrid heat sink to remain cooler for a longer duration of time during heat treatment than with other heat sinks made from single materials (e.g., a metal or a refractory block).

Figure 12A:
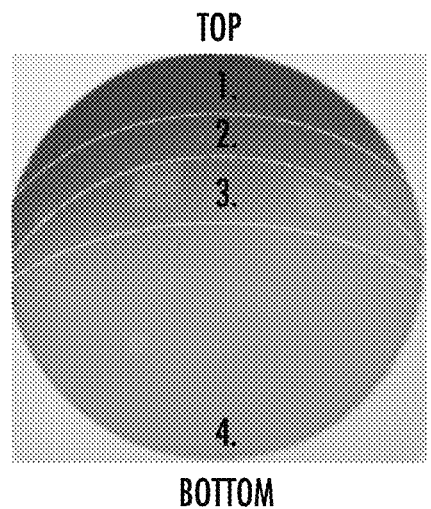
FIG. 12A is an image of a wafer in accordance with embodiments of the disclosure.
Figure 12B:
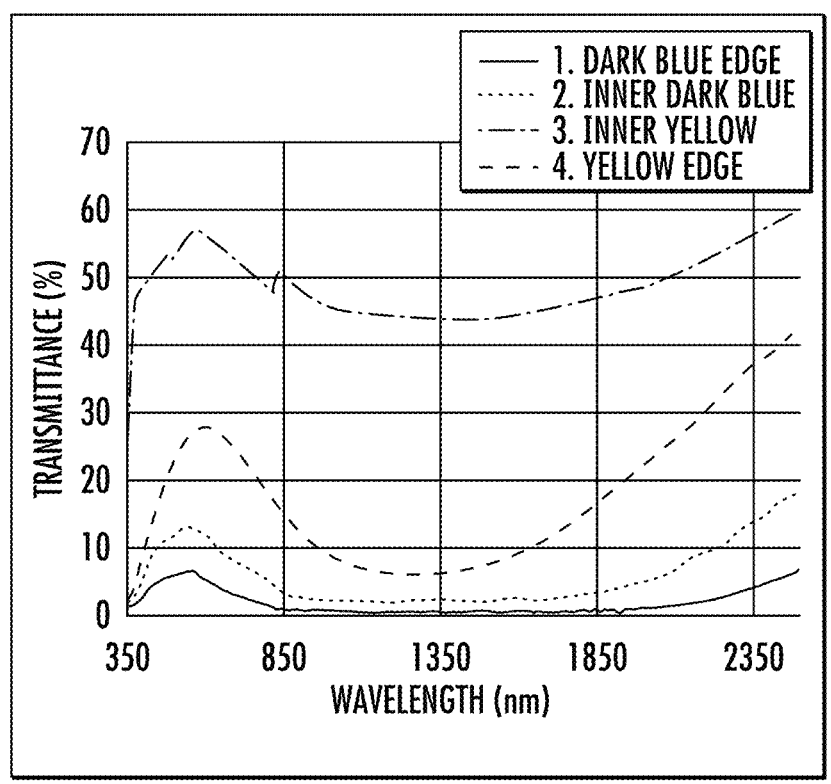
FIG. 12B is a plot of transmittance vs. wavelength for the wafer of FIG. 12A.
Figure 14A:
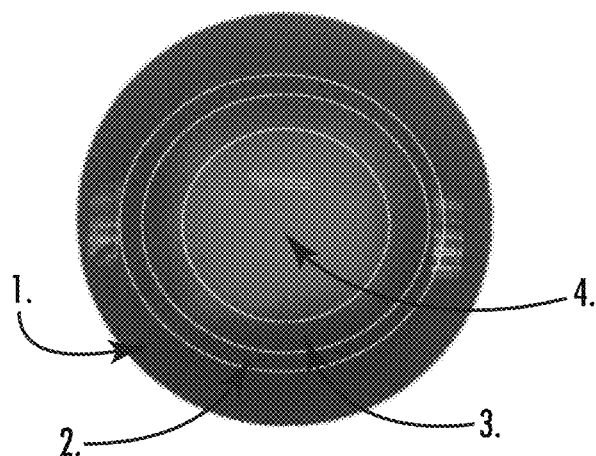
FIG. 14A is an image of a wafer in accordance with embodiments of the disclosure.
Figure 14B:
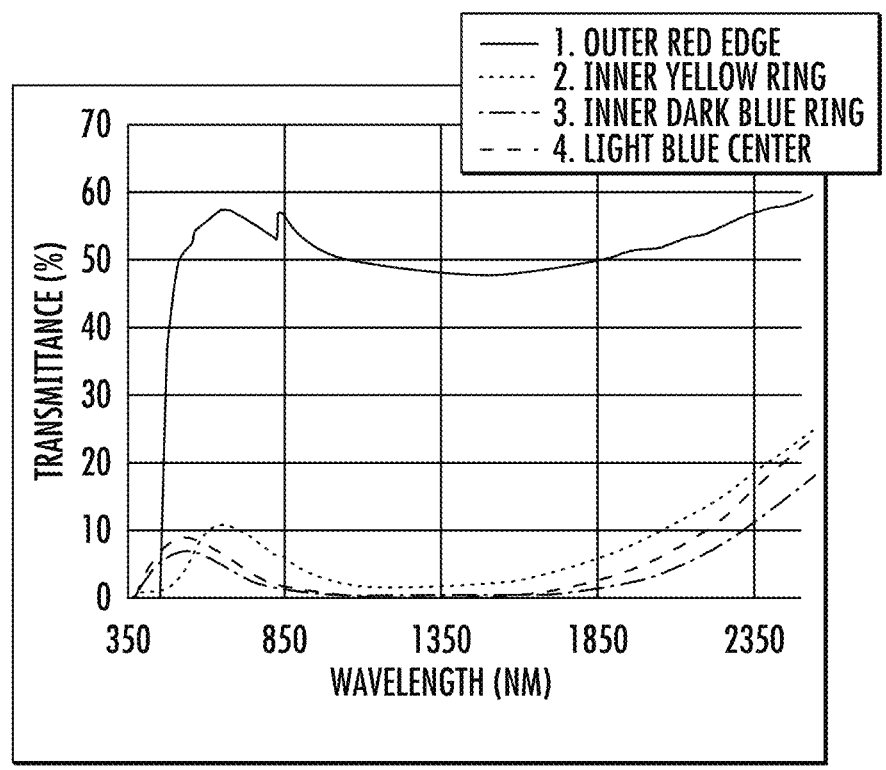
FIG. 14B is a plot of transmittance vs. wavelength for the wafer of FIG. 14A.

As shown in FIGS. 12A and 14A, hybrid heat sinks of varying shape and size enable the creation of gradient tint and colored glass, for example gradient tint and colored sunglasses. Conventionally, such graded lenses are manufactured by laminating an organic film with a gradient in tint or color between two glass plies and with coatings applied to the glass surface. The embodiments disclosed herein develop the gradient tint within the glass, as compared to the conventional methods that develop the tint exterior of the glass. The embodiments disclosed herein therefore have the advantage of not being susceptible to scratching and eliminating the need for lamination, thus reducing cost.

The gradient tint lens shown in FIG. 12A was created by placing an un-ceramed lens blank into a refractory holder and setting the 'hybrid' heat sink with a sillimanite core over approximately half of the lens. The heat sink assemblage rested on a metal lens carrier and was not in direct contact with the lens. To further slow the heat transfer, a piece of aluminum foil cut to resemble a half-circle was placed on the opposing surface of the lens that was beneath the heat sink, this providing infrared reflectivity on both surfaces of the lens. The entire assembly was heat treated by placing it in, for example, a pre-heated oven at about 510° C., holding at that temperature for about one hour, cooling to about 425° C. at 1° C. per minute, and then cooling to room temperature at furnace rate. Optical absorbance measurements were collected at various regions of the 1.9 mm thick lens to demonstrate the gradient of color that this treatment produced (see FIG. 12B). At the top of the sample (denoted in FIG. 12A), the lens was dark blue, which gradually faded to a lighter blue, then to a blue-green, and finally to a yellow. Average ultra-violet (UV), visible (VIS), and near-infrared (NIR) transmittance for the different regions is shown in Table 9.

TABLE 9

| Wavelength Range (nm) | Average Transmittance (%) | | | |
| --- | --- | --- | --- | --- |
| | 1. Blue Edge | 2. Inner Dark Blue | 3. Inner Yellow | 4. Yellow Edge |
| 200-380 | 0.05 | 0.01 | 0.80 | 1.20 |
| 380-750 | 4.40 | 9.72 | 53.26 | 22.32 |
| 750-2000 | 0.70 | 2.82 | 45.59 | 10.79 |

One exemplary embodiment of a heat sink design that is highly effective for the creation of gradient tint and gradient colored objects is comprised of a sillimanite refractory core 100 (about 6 cm×2.5 cm×2.5 cm in size) that is wrapped in ⅛" thick Kaolin wool (e.g., Fiberfrax®) and then enveloped in aluminum foil (approximate thickness 0.016 mm), as shown in FIGS. 13A-13E. The sillimanite and Kaolin wool serve as the insulating core and the aluminum foil provides broad-band infrared rejection, thus reflecting much of the heat away from the surface of the lens. Fused silica was also substituted for sillimanite as the core material in some embodiments and provided similar results. Therefore, it is contemplated that any material with a thermal conductivity between 1.4 and 1.6 W/m/K is suitable as a core for these hybrid heat sinks.

Figure 13A:
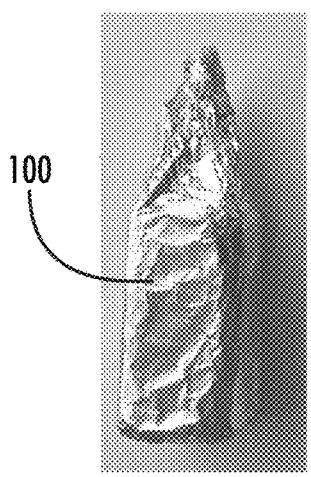
FIGS. 13A-13E are images of a heat sink in accordance with embodiments of the disclosure.
Figure 13B:
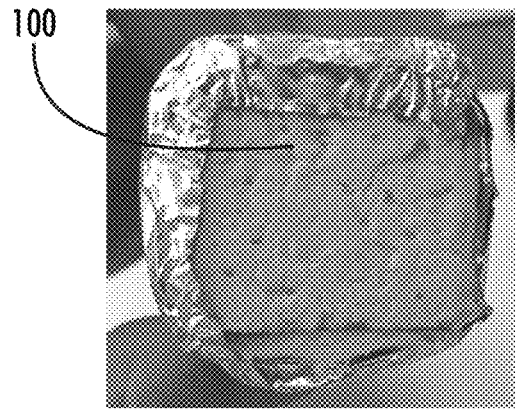
Figure 13C:
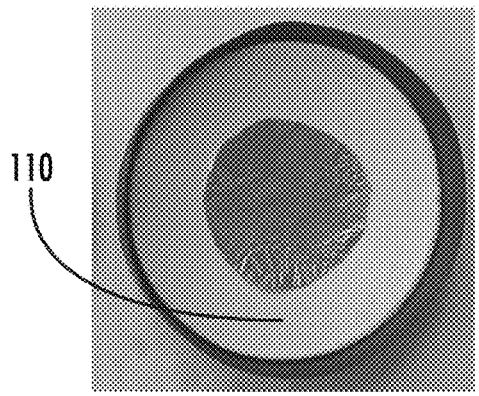
Figure 13D:
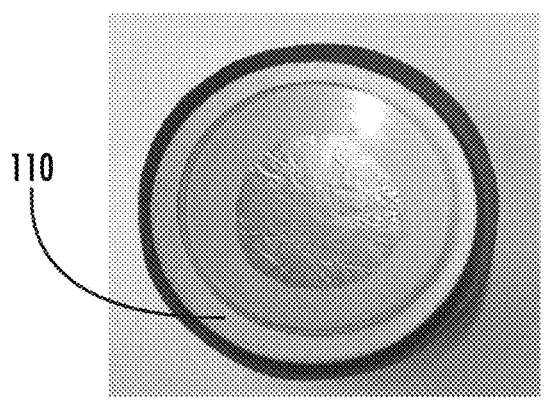
Figure 13E:
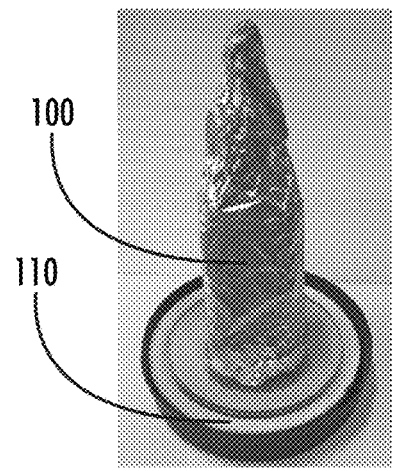

As shown in FIGS. 13A and 13E, in some embodiments, the aluminum foil was twisted to make a point at the top of the heat sink. To provide infrared reflectivity on the bottom side of the lens, a circular piece of aluminum foil was placed in the bottom of a lens holder 110 (FIG. 13C) and then the lens was placed atop it (FIG. 13D).

In one exemplary process, the heat sink shown in FIGS. 13A and 13B was then placed in the center of the lens blank in direct contact with the lens (FIG. 13E). The assembly was then heat treated by placing it a furnace pre-heated at, for example, about 550° C., holding at that temperature for about fifteen minutes, cooling to about 425° C. at 1° C. per minute, and then cooling to room temperature at furnace rate. As shown in FIG. 14A, optical absorbance measurements were collected at various regions of the 1.9 mm thick lens to demonstrate the range of color that this treatment produced (see FIG. 14B). As shown in FIG. 14A, this heat sink resulted in concentric gradient color. The outer edge of the lens was red. Closer in from the edge the color shifted to a dark yellow, and then to a dark blue. The center of the lens was a light blue. Average ultra-violet (UV), visible (VIS), and near-infrared (NIR) transmittance for the different regions is shown in Table 10.

TABLE 10

| Wavelength Range (nm) | Average Transmittance (%) | | | |
| --- | --- | --- | --- | --- |
| | 1. Outer Red Edge | 2. Inner Yellow Ring | 3. Inner Dark Blue Ring | 4. Light Blue Center |
| 200-380 | 0 | 0.05 | 0.06 | 0.09 |
| 380-750 | 40 | 6.17 | 4.72 | 6.26 |
| 750-2000 | 50.15 | 3.71 | 0.7 | 1.26 |

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A glass-ceramic, comprising:
   a silicate-containing glass comprising a first portion and a second portion; and
   a plurality of crystalline precipitates comprising at least one of W and Mo, wherein the crystalline precipitates are distributed within at least one of the first and second portions of the silicate-containing glass, wherein the glass-ceramic comprises a difference in absorbance between the first and second portions of 0.04 optical density (OD)/mm or greater over a wavelength range of from 400 nm to 1500 nm.

2. The glass-ceramic of claim 1, wherein the plurality of crystalline precipitates comprise an oxide of the chemical form of one or more of $M_xWO_3$ and $M_xMoO_3$, wherein M is one or more of H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, and U, and $0<x<1$.

3. The glass-ceramic of claim 1, further comprising:
   one or more of $WO_3$ and $MoO_3$ from 0 mol % to 15 mol % in total.

4. The glass-ceramic of claim 1, further comprising:
   at least one of: (i) Au from 0.001 mol % to 0.5 mol %, (ii) Ag from 0.025 mol % to 1.5 mol %, and (iii) Cu from 0.03 mol % to 1 mol %.

5. The glass-ceramic of claim 1, further comprising:
   at least one of: (i) Au from 0.001 mol % to 0.5 mol %, (ii) Ag from 0.1 mol % to 1 mol %, and (iii) Cu from 0.03 mol % to 1 mol %.

6. The glass-ceramic of claim 1, wherein the plurality of crystalline precipitates comprises non-stoichiometric tungsten suboxides, and further wherein the plurality of crystalline precipitates is intercalated with dopant cations selected from the group of transition metals consisting of Ag, Au and Cu.

7. The glass-ceramic of claim 1, wherein a Contrast Ratio between the first portion and the second portion is from 1.4 to 165 over a wavelength range of from 400 nm to 700 nm.

8. The glass-ceramic of claim 1, wherein a Contrast Ratio between the first portion and the second portion is from 1.5 to 14 over a wavelength range of from 750 nm to 1500 nm.

9. The glass-ceramic of claim 1, wherein the difference in absorbance between the first and second portions is from 0.04 OD/mm to 49 OD/mm over a wavelength range of from 400 nm to 750 nm.

10. The glass-ceramic of claim 1, further comprising:
    $V_2O_5$ from 0.0001 mol % to 0.5 mol %.

11. The glass-ceramic of claim 1, wherein the plurality of crystalline precipitates comprises at least W.

12. The glass-ceramic of claim 1, wherein the plurality of crystalline precipitates comprises at least W and Mo.

* * * * *